United States Patent [19]
Naka et al.

[11] Patent Number: 5,272,519
[45] Date of Patent: Dec. 21, 1993

[54] RECORDING/REPRODUCING APPARATUS EMPLOYING SUM AND DIFFERENCE SEQUENTIAL CIRCUITRY FOR LINES ADJACENT IN THE SECOND OR THIRD DIMENSIONAL DIRECTION FOLLOWED BY TIME BASE CONVERSION CIRCUITRY

[75] Inventors: Kazutaka Naka, Yokohama; Takashi Furuhata, Kamakura; Hiroaki Takahashi, Yokohama, all of Japan

[73] Assignee: Hitachi, Ltd., Tokyo, Japan

[21] Appl. No.: 713,989

[22] Filed: Jun. 12, 1991

[30] Foreign Application Priority Data

Jun. 27, 1990 [JP] Japan .................. 2-166594
Nov. 21, 1990 [JP] Japan .................. 2-314018

[51] Int. Cl.⁵ .......................................... H04N 11/20
[52] U.S. Cl. .......................................... 358/11; 358/12
[58] Field of Search ............... 358/11, 12, 141, 142, 358/242

[56] References Cited

U.S. PATENT DOCUMENTS

| | | | |
|---|---|---|---|
| 4,415,931 | 11/1983 | Dischert | 358/242 |
| 4,532,555 | 7/1985 | Sagara et al. | 358/11 |
| 4,558,347 | 12/1985 | Pritchard et al. | 358/11 |
| 4,623,913 | 11/1986 | Fling et al. | 358/11 |
| 4,757,390 | 7/1988 | Mehrgardt et al. | 358/11 |
| 4,772,961 | 9/1988 | Ichinoi | 358/12 |
| 4,816,899 | 3/1989 | Strolle et al. | 358/12 |
| 4,908,697 | 3/1990 | Tsinberg et al. | 358/12 |
| 4,985,769 | 1/1991 | Yasumoto et al. | 358/142 |
| 5,109,271 | 4/1992 | Borgers et al. | 358/12 |

FOREIGN PATENT DOCUMENTS

| | | |
|---|---|---|
| 0454115 | 10/1991 | European Pat. Off. |
| 1-228282 | 9/1989 | Japan |
| 1-228283 | 9/1989 | Japan |

*Primary Examiner*—James J. Groody
*Assistant Examiner*—John W. Miller
*Attorney, Agent, or Firm*—Antonelli, Terry, Stout & Kraus

[57] ABSTRACT

The system is made up of signal conversion unit for converting a video signal into two-line sum signal and difference signal for every two lines, time base conversion unit for time base converting the signals so that the transmission band of the difference signal is lower than the transmission band of the sum signal, and signal multiplexing unit for time-sharing multiplexing a time base converted sum signal and a time base converted difference signal.

29 Claims, 11 Drawing Sheets

RECORDING/REPRODUCING APPARATUS EMPLOYING SUM AND DIFFERENCE SEQUENTIAL CIRCUITRY FOR LINES ADJACENT IN THE SECOND OR THIRD DIMENSIONAL DIRECTION FOLLOWED BY TIME BASE CONVERSION CIRCUITRY

BACKGROUND OF THE INVENTION

The present invention relates to a video signal processing unit for recording or transmitting a video signal or a video signal recording and reproducing unit for a video tape recorder or the like.

A high-resolution and high-definition video signal such as a high vision signal has a wide band of about five times larger than the band of the conventional NTSC signal, PAL signal or SECAM signal, so that such a high-resolution and high-definition video signal requires a consumption of a quantity of a video tape about five times larger than the quantity of a video tape required for a video tape recorder for recording and reproducing the conventional NTSC signal, PAL signal or SECAM signal.

In order to solve the above problem, according to the conventional high vision signal processing unit, the tape head system has been improved to increase the recording density and a video signal has been recorded on a reduced band by deducting or thinning out the number of lines for a recorded video signal. Examples of the prior art technique using a system of the type as described above are disclosed in JP-A-1-228282 and JP-A-1-228283.

SUMMARY OF THE INVENTION

The above-described prior art techniques, however, have a serious problem that the vertical resolution of a reproduced video signal is extremely deteriorated because the video signal is recorded by reducing the number of horizontal scanning lines to about a half of the original number of the horizontal scanning lines of the video signal.

Accordingly, it is an object of the present invention to provide a video signal processing unit which eliminates the above-described drawbacks of the prior art techniques, which can reduce the band of a recording signal without substantially deteriorating both horizontal and vertical resolution of a reproduced video signal and which can achieve a long-time recording and reproducing of a video signal of high fineness and high resolution without deteriorating the quality of the video signal.

In order to achieve the above object, according to one aspect of the present invention, a sum signal and a difference signal are calculated for at least two line signals respectively that are adjacent to each other in the two dimensional or three dimensional direction within one field or between fields or between frames of a video signal. The video signal is then recorded by converting the time base such that the transmission band of the difference signal is reduced relative to the transmission band of the sum signal.

Further, the video signal is time base converted and time-sharing multiplexed in accordance with a maximum frequency for transmitting each of a sum signal and a difference signal of color signals of the above two lines in addition to a sum signal and a difference signal of luminance signals of the two lines.

Further, by the above-described time base conversion, either a redundant vertical blanking period existing in each one field of an input video signal or a horizontal blanking period existing in each one line of the input video signal is reduced, and if necessary, the video signal is shifted on the time base to have a redundant time during a desired period.

The video signal is recorded or transmitted by increasing the gain of the above-described difference signal when its amplitude is small or by reducing the gain of this signal when its amplitude is large.

Further, a two-dimensional filter processing is carried out between two mutually adjacent line blocks in order to avoid discontinuity of a signal which occurs between a line block of two lines that are reproduced by a sum signal and a difference signal and a line block of two lines that are reproduced by the next sum signal and the next difference signal.

A noise which superposes on a color signal transmitted in a band narrower than the band for a luminance signal is distributed in a low frequency, and this becomes a main factor for the deterioration of the quality of a picture. Therefore, in order to reduce the deterioration of the S/N ratio of the color signal, a noise elimination circuit is applied to the reproduced line-sequential color signal.

According to the present invention, an input video signal is converted into a sum signal and a difference signal, and the transmission band of the difference signal is lowered to record and transmit the signal. Therefore, it becomes possible to reduce the band of the recording or transmitting signal without substantially deteriorating the quality of a picture because of characteristics of human vision and characteristics of a general screen image.

DESCRIPTION OF THE PREFERRED EMBODIMENTS

Embodiments of the present invention will be explained below with reference to the drawings.

Figure 1:
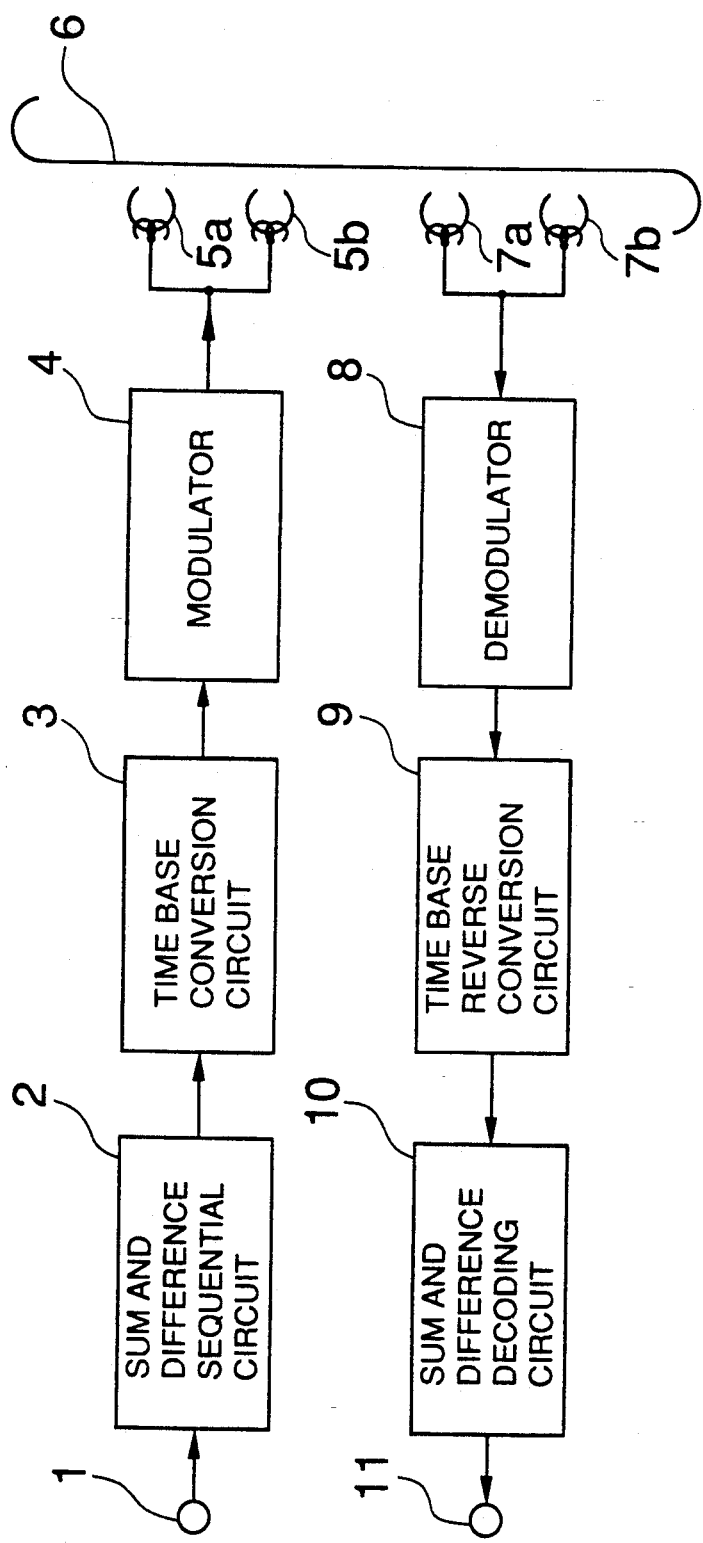
FIG. 1 is a block diagram showing one embodiment of the present invention.

FIG. 1 is a block diagram showing one embodiment of the present invention for the case when the present invention is applied to a rotary two-head type magnetic recording and reproducing unit.

In FIG. 1, 1 designates an input terminal to which a video signal to be recorded is applied, and 2 designates a sum and difference line sequential circuit for calculating a sum signal and a difference signal between two mutually adjacent lines within a field, between fields or between frames of a video signal inputted from the terminal 1 and for outputting the result of the calculation in the sequence of lines. 3 designates a time base conversion circuit for converting the time base of the line sequential sum signal and difference signal, 4 designates a modulator for modulating (for example, FM modulation) a time-base converted recording sum and difference signals into a form suitable for the recording in a tape head system, 5a and 5b designate rotary recording magnetic heads for recording a modulated signal on a tape, and 6 designates a magnetic tape. 7a and 7b designate rotary reproduction magnetic heads for reproducing a signal recorded on the magnetic tape 6, 8 designates a demodulator for demodulating a reproduced signal, 9 designates a time base reverse conversion circuit for reverse converting a sum signal and a difference signal of a demodulated reproduction sum and difference signal on the time base at the ratio of one to one, 10 designates a sum and difference decoding circuit for calculating time-base converted sum signal and difference signal into a state of an original video signal and for outputting the video signal as a reproduced video signal, and 11 designates an output terminal for the reproduced video signal.

The above two rotary magnetic heads 5a and 5b (or 7a and 7b) are fitted to a rotor not shown in the drawing, to form an angle of 180 degrees between the two rotary magnetic heads. The magnetic tape 6 is wound up on this rotor at an angle slightly larger than 180 degrees, so that the two rotary magnetic heads 5a and 5b (or 7a and 7b) are simultaneously brought into contact with this magnetic tape 6 to record the same signal. Thus, a so-called overlap section is formed.

Figure 2:
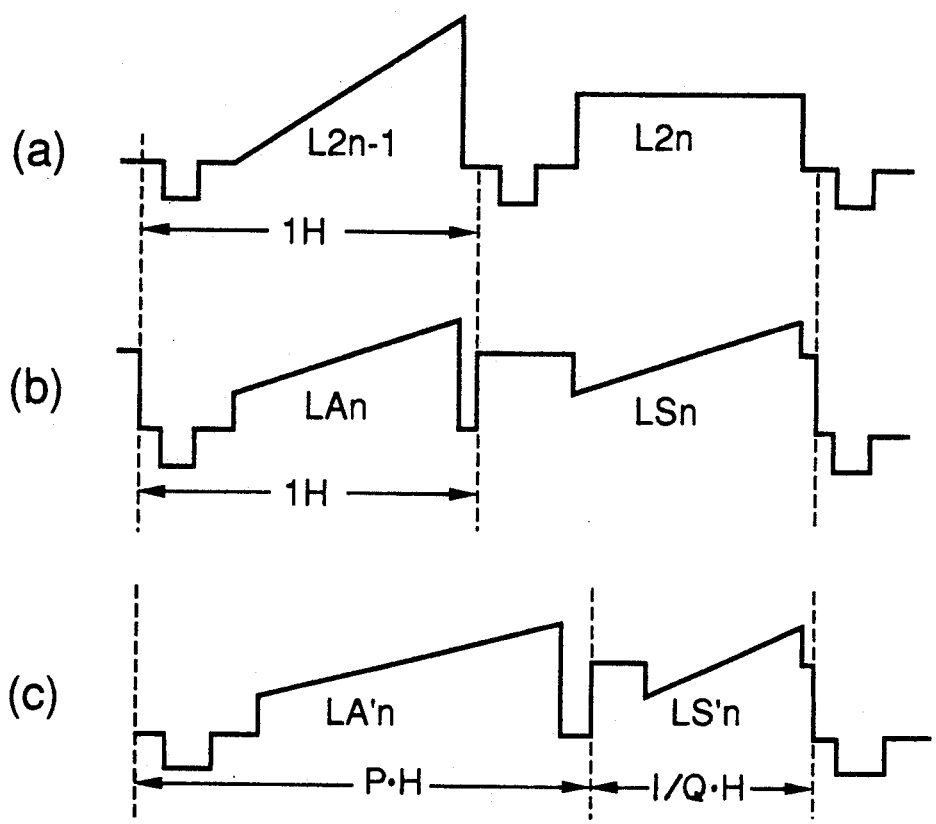
FIG. 2 is a diagram for explaining the operation of the embodiment shown in FIG. 1.

Next, the operation of the present embodiment will be explained for the case where signals of two lines which are mutually adjacent within a field are converted, with reference to FIG. 1 and the waveform diagram shown in FIG. 2. When a video signal is applied at the terminal 1, the sum and difference line sequential circuit 2 calculates a sum signal and a difference signal between two lines which are mutually adjacent to each other within a field, and sequences the lines. FIG. 2(a) is a waveform diagram of an input video signal, where $L_{2n-1}$ designates a $(2n-1)$-th line signal and $L_{2n}$ designates a $2 \cdot n$-th line signal. For the two line signals of $L_{2n-1}$ and $L_{2n}$ which are adjacent to each other within the field, the sum and difference line sequential circuit 2 calculates a sum signal $LA_n$ and a difference signal $LS_n$ as shown in expressions (1) and (2):

$$LA_n = (L_{2n-1} + L_{2n})/2 \quad (1)$$

$$LS_n = (L_{2n-1} - L_{2n})/2 \quad (2)$$

The sum and difference line sequential circuit 2 then produces an output of the calculated result in the sequence of the lines so that the sum signal and the difference signal appear alternately, as shown in FIG. 2(b). For example, for video signals that are inputted in the order of $L_1, L_2, L_3, L_4, \ldots$, the sum and difference line sequential circuit 2 calculates the sum signal $LA_n$ and the difference signal $LS_n$ as shown in expressions (3) to (6):

$$LA_1 = (L_1 + L_2)/2 \quad (3)$$

$$LS_1 = (L_1 - L_2)/2 \quad (4)$$

$$LA_2 = (L_3 + L_4)/2 \quad (5)$$

$$LS_2 = (L_3 - L_4)/2 \quad (6)$$

and produces an output in the order of $LA_1, LS_1, LA_2, LS_2, \ldots$ As shown in FIG. 2(c), the time base conversion circuit 3 converts the sum signal and the difference signal which have been sequenced in the order of the lines by the sum and difference sequential circuit 2 shown in FIG. 2(b), such that the sum signal $LA_n$ is converted into a signal $LA_n'$ which is a result that the horizontal scanning period of 1H of the sum signal $LA_n$ has been time base extended by P (P>1) times and the difference signal $LS_n$ is converted into a signal $LS_n'$ which is a result that the horizontal scanning period of 1H of the difference signal $LS_n$ has been time base compressed to 1/Q (Q>1). The time base conversion circuit 3 then produces the sum signal $LA_n'$ and the difference signal $LS_n'$ by time-sharing multiplexing these signals.

The signals that have been time base converted by the time base conversion circuit 3 as shown in FIG. 2(c) are modulated, such as frequency modulation, by the modulator 4 and then recorded on the tape 6 through the recording head 5. At the time of reproduction, signals that have been reproduced from the tape 6 by the reproduction head 7 are demodulated by the demodulator 8, and the sum signal $LA_n$ as shown in FIG. 2(c) is time base extended and the difference signal $LS_n$ is time base compressed to 1/Q so that a time-sharing multiplexed signal is obtained. For the signals produced from the demodulator 8, the time base reverse conversion circuit 9 time base compresses the sum signal $LA_n'$ into 1/P and time base extends the difference signal $LS_n'$ by Q times so that these signals are reverse converted into a sum and difference line sequential state in which the sum signal $LA_n$ and the difference signal $LS_n$ as shown in FIG. 2(b) appear alternately in 1H horizontal scanning period. For the line sequential signal of the sum signal $LA_n$ and the difference signal $LS_n$ that are the result of the time base reverse conversion by the time base reverse conversion circuit 9, the sum and difference decoding circuit 10 calculates to obtain signals $L_{2n-1}$ and $L_{2n}$ of the two mutually adjacent lines of the original video signal by adding and subtracting the sum signal $LA_n$ and the difference signal $LS_n$ respectively as shown in expressions (7) and (8):

$$LA_n + LS_n = (L_{2n-1} + L_{2n})/2 + (L_{2n-1} - L_{2n})/2 \quad (7)$$
$$= L_{2n-1}$$

-continued $$LA_n - LS_n = (L_{2n-1} + L_{2n})/2 - (L_{2n-1} - L_{2n})/2 \quad (8)$$
$$= L_{2n}$$

and produces an output line sequentially in the order of $L_{2n-1}$ and $L_{2n}$, so that a reproduced signal in the similar state of the original video signal can be restored.

The above sum signal $LA_n$ is a mean value of two adjacent lines of video signals. When only this signal is transmitted, a signal component of high vertical correlation such as vertical lines of an image can be reproduced but a signal component of low vertical correlation such as thin lateral lines can not be transmitted. On the other hand, the difference signal $LS_n$ is a difference value of the two adjacent lines of video signals and this includes a signal component of low vertical correlation. Accordingly, it is in principle not possible to reproduce the original video signal unless the sum signal $LA_n$ and the difference signal $LS_n$ are completely transmitted without deterioration. However, from the nature of visual characteristics of human beings or the like, deterioration of a picture quality of a general video signal is hardly recognized by the eyes of human beings so long as a signal component of high vertical correlation and a signal component of high horizontal correlation are reproduced satisfactorily. Accordingly, it is possible to reproduce the original video signal without substantial deterioration of the picture quality by transmitting only the low frequency component corresponding to the signal component of high horizontal correlation from the sum signal $LA_n$ having the signal component of high vertical correlation and the difference signal $LS_n$ having the signal component of low vertical correlation. In the present embodiment, the sum signal $LA_n$ is time base extended by P times and the difference signal $LS_n$ is time base compressed to 1/Q, as shown in FIGS. 2(b) and 2(c). For the above reason as described above, when the maximum frequency of the original video signal is $W_B$, it is sufficient to have a band of the recording video signal of at least $W_R = W_B/P$ in order to record and reproduce the sum signal $LA_n$ without deteriorating the picture quality. Therefore, it is possible to reduce the recording transmission band to 1/P from the modulator including the demodulator through the tape head system. For example, P=1.33, Q=1/(2−P)=1.5 and the maximum frequency of a video signal is $W_B$=20 MHz, it is possible to reduce the necessary recording transmission band $W_R$ to about 15 MHz as shown in an expression (9):

$$W_R = 20/1.33 = 15 \ [MHz] \quad (9)$$

In this case, the difference signal $LS_n$ is restricted to have a band of $W_B/P$ after having been time base compressed to 1/Q. Therefore, a maximum frequency of the signal that can be transmitted is limited to $W_B/(P \cdot Q)$. In the above example, the band of the difference signal $LS_n$ is limited to about a half of the band of the sum signal $LA_n$. Even if the above processing is carried out, the signal component of high vertical correlation and the signal component of high horizontal correlation of the image are not deteriorated but only the resolution in an oblique direction that is not easily recognized by the nature of visual characteristics is lowered. Therefore, it is possible to reproduce the original video signal without substantial deterioration of the picture quality. By the above-described processing, it is possible to reduce the band of the recording video signal without deteriorating both horizontal and vertical resolution, and it is possible to record and reproduce a high-fineness and high-definition video signal in a compact cassette tape system over many hours by taking advantage of the above merit in combination with a high-density recording function by the improvement of the tape head system.

A detailed embodiment of the sum and difference line sequential circuit 2 in FIG. 1 will be explained below with reference to the block diagram in FIG. 3 and the operation waveform diagram in FIG. 4.

Figure 3:
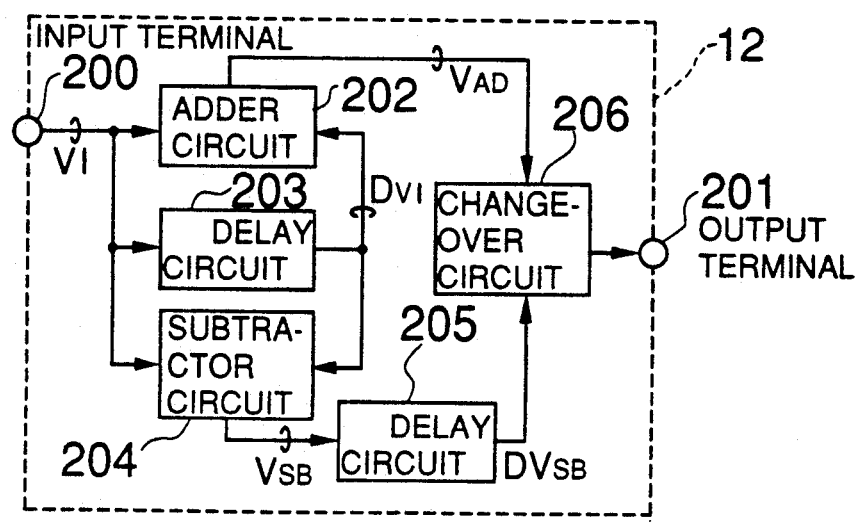
FIG. 3 is a block diagram showing an embodiment of a sum and difference line sequential circuit shown in FIG. 1.
Figure 4:
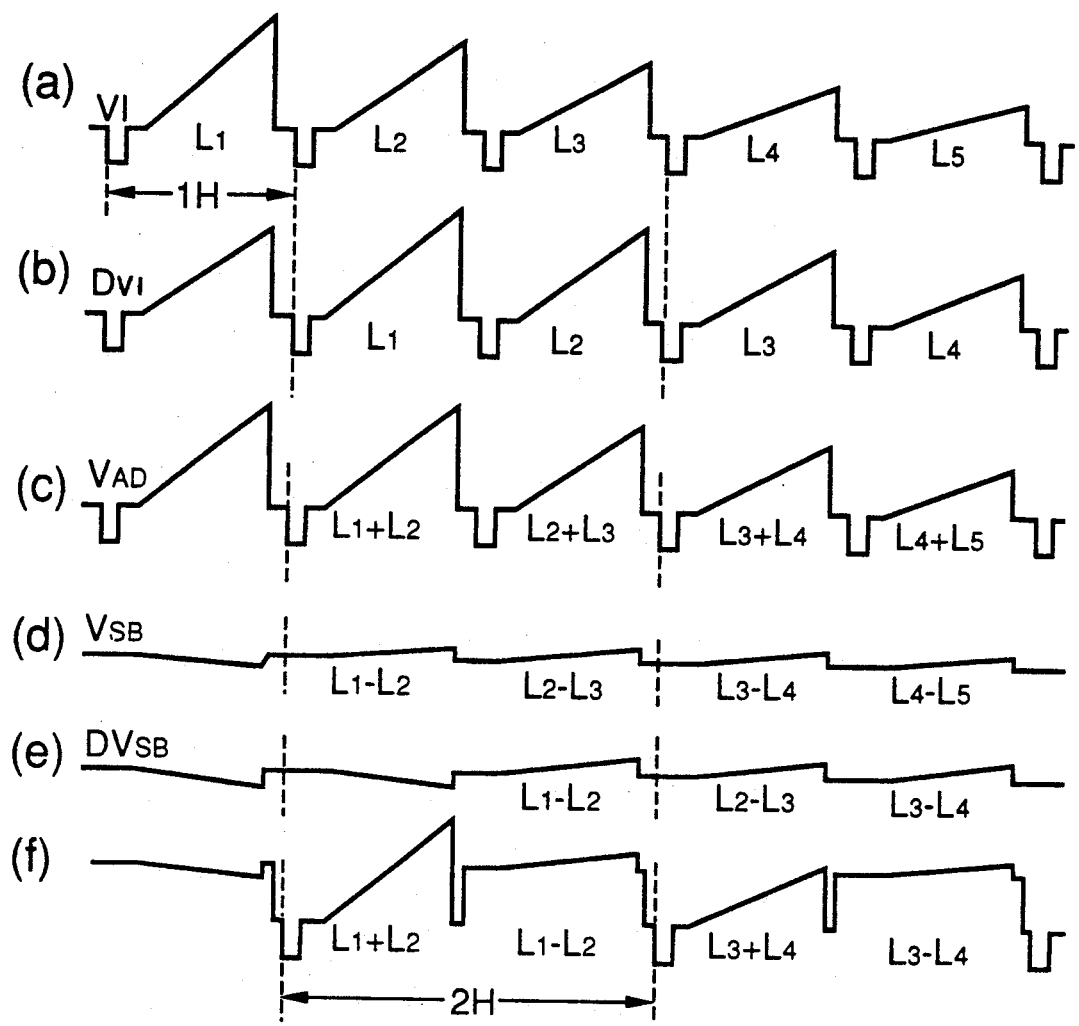
FIG. 4 is a diagram for explaining the operation of the embodiment shown in FIG. 3.

In FIG. 3, 200 designates an input terminal for a video signal for line sequencing the sum and difference of signals, 201 designates an output terminal for outputting a sum signal and a difference signal for each line by alternately sequencing the lines, and 202 designates an adder circuit for adding a video signal inputted to the input terminal 200 and an input video signal that is delayed by 1H. 203 designates a delay circuit which may be a 1H delay circuit for delaying a video signal inputted to the terminal 200 by one horizontal scanning period, 204 designates a subtractor circuit for subtracting an input video signal inputted to the input terminal 200 from an output signal from the 1H delay circuit 203, 205 designates a delay circuit which may be a 1H delay circuit for delaying an output from the subtractor circuit 204 by one horizontal scanning period, and 206 designates a change-over circuit for outputting to the terminal 201 an output from the 1H delay circuit 205 and an output from the adder circuit 202 by alternately changing over these outputs for each line, thereby effecting multiplexing of the sum and difference signals. The delay circuits 203 and 205 may also be field or frame delay circuits.

FIG. 4(a) is a waveform diagram of a video signal VI to be applied to the terminal 200, and $L_1$, $L_2$, $L_3$, ... designates lines of the video signal to be applied sequentially. The video signal VI applied from the input terminal 200 is delayed by one horizontal scanning period by the 1H delay circuit 203. FIG. 4(b) shows an output DVI of the 1H delay circuit 203, and in this diagram, each line of FIG. 4(a) is delayed by one horizontal scanning line respectively. The adder circuit 202 adds the input video signal VI shown in FIG. 4(a) and the output DVI from the 1H delay circuit 203 together, to obtain an output waveform shown in FIG. 4(c). Similarly, the subtractor circuit 204 subtracts the input video signal VI in FIG. 4(a) from the output DVI from the 1H delay circuit 203 in FIG. 4(b), to obtain an output waveform shown in FIG. 4(d). The adder circuit 202 and the subtractor circuit 204 multiply a coefficient of ½ to the signals respectively so that a maximum amplitude of each output signal (from a minimum value to a maximum value) becomes equal to a maximum amplitude of each input signal. The subtractor circuit 204 applies a DC offset of ½ of the maximum amplitude in order to prevent the output signal from becoming a black level or lower if the result of the subtraction becomes a negative value. Accordingly, when the input video signal is expressed as VI, the 1H delayed video signal is expressed as DVI and the maximum amplitude value of the video signal section excluding the synchronous signal of the input video signal is expressed as $V_{max}$, an output $V_{AD}$ of the adder circuit 202 and an output $V_{SB}$ of the subtractor circuit 204 are given by expression (10) and (11):

$$V_{AD} = \tfrac{1}{2}(DVI + VI) \tag{10}$$

$$V_{SB} = \tfrac{1}{2}(DVI - VI) + \tfrac{1}{2}V_{max} \tag{11}$$

The output $V_{SB}$ of the subtractor circuit 204 shown in FIG. 4(d) is delayed by one horizontal scanning period by the 1H delay circuit 205, to form a waveform as shown in FIG. 4(e). The change-over circuit 206 changes over the output $V_{AD}$ from the adder circuit 202 shown in FIG. 4(c) and the output $DV_{SB}$ from the 1H delay circuit 205 shown in FIG. 4(e) at every one horizontal scanning period, so that a signal which is a line sequential signal of the sum signal $V_{AD}$ and the difference signal $V_{SB}$ is obtained at the output terminal 201 as shown in FIG. 4(f).

The 1H delay circuits 202 and 205 used in the present embodiment can be easily realized by a glass delay line or a charge coupling device (CCD) delay line. When the circuit of the present embodiment is realized by a digital circuit, it is possible to achieve the delay of one horizontal scanning period in a small scale circuit by structuring the above-described 1H delay circuits 202 and 205 in line memories. Also, the adder circuit 202, the subtraction circuit 204 and the change-over circuit 206 can be easily realized by logical circuits, so that the circuits can be formed in integrated circuits to have a compact and low-cost device. When the sum and difference line sequential circuit 2 is structured by a digital circuit, the input video signal from the terminal 1 is converted into a digital signal by an A/D conversion circuit which is not shown in the diagram, and the digital signal obtained is supplied to the terminal 200.

The above describes an example of the detailed structure of the sum and difference line sequential circuit 2 shown in FIG. 1, which is a functional block for generating a sum signal and a difference signal from an input video signal. The sum and difference decoding circuit 10 in FIG. 1 which is a functional block for decoding an original video signal from a sum signal and a difference signal can also be realized by a structure similar to that in FIG. 3. In this case, in FIG. 3, the input terminal 200 becomes an input terminal of the sum and difference line sequential signal reproduced from the time base reverse conversion circuit 9 and the output terminal 201 becomes an output terminal of the reproduced video signal restored in the original state. As described above, the offset is applied so that an output signal is not at a black level or a lower level even if the difference signal takes a negative value. Therefore, when the sum and difference line sequential signal is expressed as VI, the signal obtained by delaying the above signal VI by one horizontal line by the 1H delay circuit 203 is expressed as DVI, and the maximum amplitude excluding the synchronous signal of the video signal is expressed as $V_{max}$, then the output $V_{AD}$ of the adder circuit 202 and the output $V_{SB}$ of the subtractor circuit 204 are given by the following expressions (12) and (13):

$$V_{AD} = DVI + VI - \tfrac{1}{2}V_{max} \tag{12}$$

$$V_{SB} = DVI - VI - \tfrac{1}{2}V_{max} \tag{13}$$

As described above, it is possible to achieve sum and difference line sequencing of an input video signal and sum and difference decoding of a reproduced signal in the same circuit by changing the coefficient and offset value of the arithmetic processing. Thus, there is an economic effect that the required circuit scale is reduced by sharing one circuit for the two operations.

Next, a detailed example of the time base conversion circuit 3 in FIG. 1 will be explained with reference to the block diagram in FIG. 5.

Figure 5:
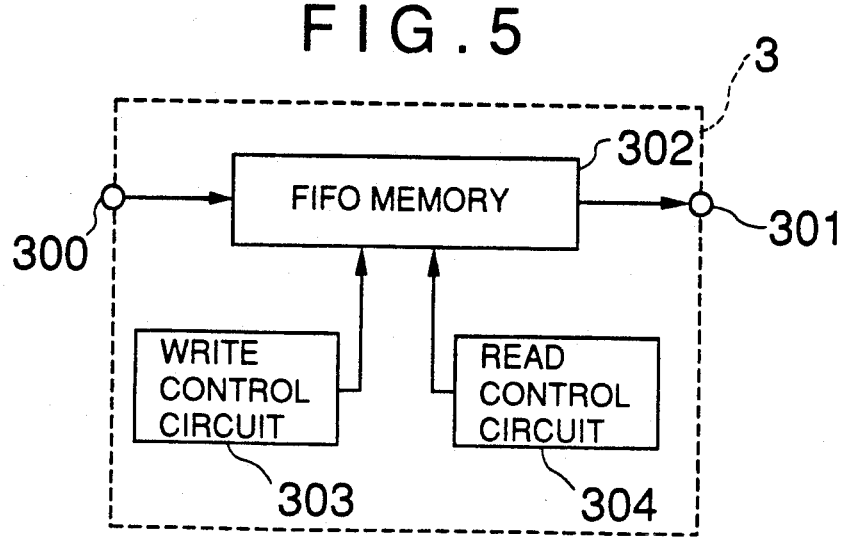
FIG. 5 is block diagram showing an embodiment of a time base conversion circuit shown in FIG. 1.

FIG. 5 shows an embodiment of the time base conversion circuit 3 which is realized by a digital circuit. In this case, the above-described sum and difference line sequential circuit 2 is also structured by a digital circuit, and the video signal which has been line sequenced by the circuit 2 is supplied to the time base conversion circuit 2 in the form of a digital signal. In FIG. 5, 300 designates an input terminal for a video signal which is a result of line sequencing the sum signal and the difference signal given from the sum and difference line sequential circuit 2, and 301 designates an output terminal for a video signal that has been time base converted. 302 designates a first-in and first-out (FIFO) memory, 303 designates a write control memory for the FIFO memory 302, and 304 designates a read control circuit for the FIFO memory 302. An output signal from the terminal 301 is converted into an analog signal by a D/A conversion circuit not shown in the diagram and is then applied to the modulator 4. A video signal which is a line sequenced signal of a sum signal and a difference signal that have been applied to the terminal 300 is applied to the FIFO memory 302. In this case, the write control circuit 303 controls such that all the samples during the period while a sum signal is being applied to the terminal 300 are written as data into the FIFO memory. During the period in which a difference signal is being inputted to the terminal 300, samples are reduced at a rate of one sample per two samples and this is written as data to the FIFO memory 302. On the other hand, at the read side, data is read sequentially in a predetermined cycle from the FIFO memory by the read control circuit 304, and is outputted as a sample of the time base converted video signal to the terminal 301. For example, in the case of a system for sampling one horizontal scanning period by 1440 samples, a sum signal is written in the FIFO memory 302 by writing all the 1440 samples as data and a difference signal is written by writing 720 samples as data which is a half of the total number of samples after reducing the samples at the rate of one sample for every two samples. Accordingly, at the write side, data of 2160 samples, that is $1440+720=2160$ samples, is written during two horizontal scanning periods of a sum signal and a difference signal that have been line sequenced. On the other hand, at the read side of the FIFO memory 302, data is read sequentially in a predetermined cycle at the rate of 2160 samples during two horizontal scanning periods and the data is outputted to the output terminal 301 as samples of a time base converted video signal.

As a result of the above processing, the sum signal is time base extended to 1.33 time (that is, $1440\times2/2160=1.33$), and the difference signal is time base compressed to 1/1.5 (that is, $720\times2/2160=1/1.5$). In the present embodiment, the number of data written to and the number of data read from the FIFO memory 302 respectively during the two horizontal periods which assume the sum signal and the difference signal together as one set, are equal. Accordingly, it is sufficient to have at least the number of data to be read and written during the two horizontal scanning periods (that is, 2160 samples) for the capacity of the FIFO memory 302. The processing of reducing the number of the samples of a difference signal to ½ is equivalent to reducing the sampling frequency to ½. In order to prevent the occurrence of a distortion due to aliasing due to the reduction processing, it is appropriate to have such a structure that a band control processing of low pass filter characteristics is carried out in advance for the above-described difference signal by a pre-filter processing circuit not shown in the diagram and the output thereof is supplied to the memory 302.

By the above-described processing, the time base of the sum signal is extended by 1.33 times and the time base of the difference signal is compressed to 1/1.5 so that the overall transmission signal band can be reduced to 1/1.33.

Although the difference signal has been reduced to ½ in the above embodiment, the difference signal can also be reduced to ⅓ or ¼. In this case, the quality of the picture to be reproduced is slightly deteriorated due to the reduction of the transmission band of the difference signal, but the band of the recording signal can be reduced further. In the above embodiment, samples of the difference signal are reduced at the time of writing to the FIFO memory. However, it may also be acceptable to write all the samples of the difference signal at the write time and reduce the samples at the read time, instead. It may also be acceptable to carry out extension and compression of the time base by reading data in a slower cycle than the cycle of writing when the sum signal is read, instead of reducing the samples, and by reading data in a faster cycle than the cycle of writing when the difference signal is read. Further, it may also be acceptable to have a slower cycle for sampling the difference signal than the cycle for sampling the sum signal, for the video signal which is a result of line sequencing the sum signal and the difference signal given by the sum and difference line sequential circuit 2. The value of the samples of the difference signal obtained by the above processing is equivalent to the value of the samples that are obtained by reducing to 1/N (where N is an integer of N≧2) after sampling in the same cycle as that of the sum signal. It is possible to set the rate of reducing the samples to any desired value, without being limited to an integer ratio such as ½, ⅓, ¼, etc.

The above describes the embodiment of the time base conversion circuit 3 shown in FIG. 1, and the time base reverse conversion circuit 9 in FIG. 1 can also be realized by the structure of FIG. 5. In this case, the input terminal 300 in FIG. 5 is applied with a reproduction signal of the sum signal and the difference signal applied from the demodulation circuit 8 that have been time base extended and time base compressed respectively. The sum signal and the difference signal are alternately time base converted for each horizontal scanning period by the FIFO memory 302, and the result is produced as an output to the output terminal 301. The compression and extension processings of the time base are the same as those performed by the time base conversion circuit 3. By a picture element interpolation circuit not shown in the diagram, sample picture elements of the difference signal reduced by the above-described processing at the time of recording are interpolated by adjacent or peripheral sample elements when necessary before they are outputted.

When a time base variation is included in a reproduction signal to be demodulated by the demodulation circuit 8, a time base correction circuit for removing the time base variation, not shown in the diagram, may be inserted between the demodulation circuit 8 and the time base reverse conversion circuit 9 in FIG. 1. It is also possible to provide the time base reverse conversion circuit with the above-described function of the time base correction circuit by generating a write control signal of the FIFO memory to be used in the time base reverse conversion circuit in the write control circuit 303, by following the time base fluctuation of the reproduction signal. By the above arrangement, time base correction and time base conversion can be carried out simultaneously by one FIFO memory. Thus, this has an economic effect brought about by the reduction of the circuit scale.

Figure 6:
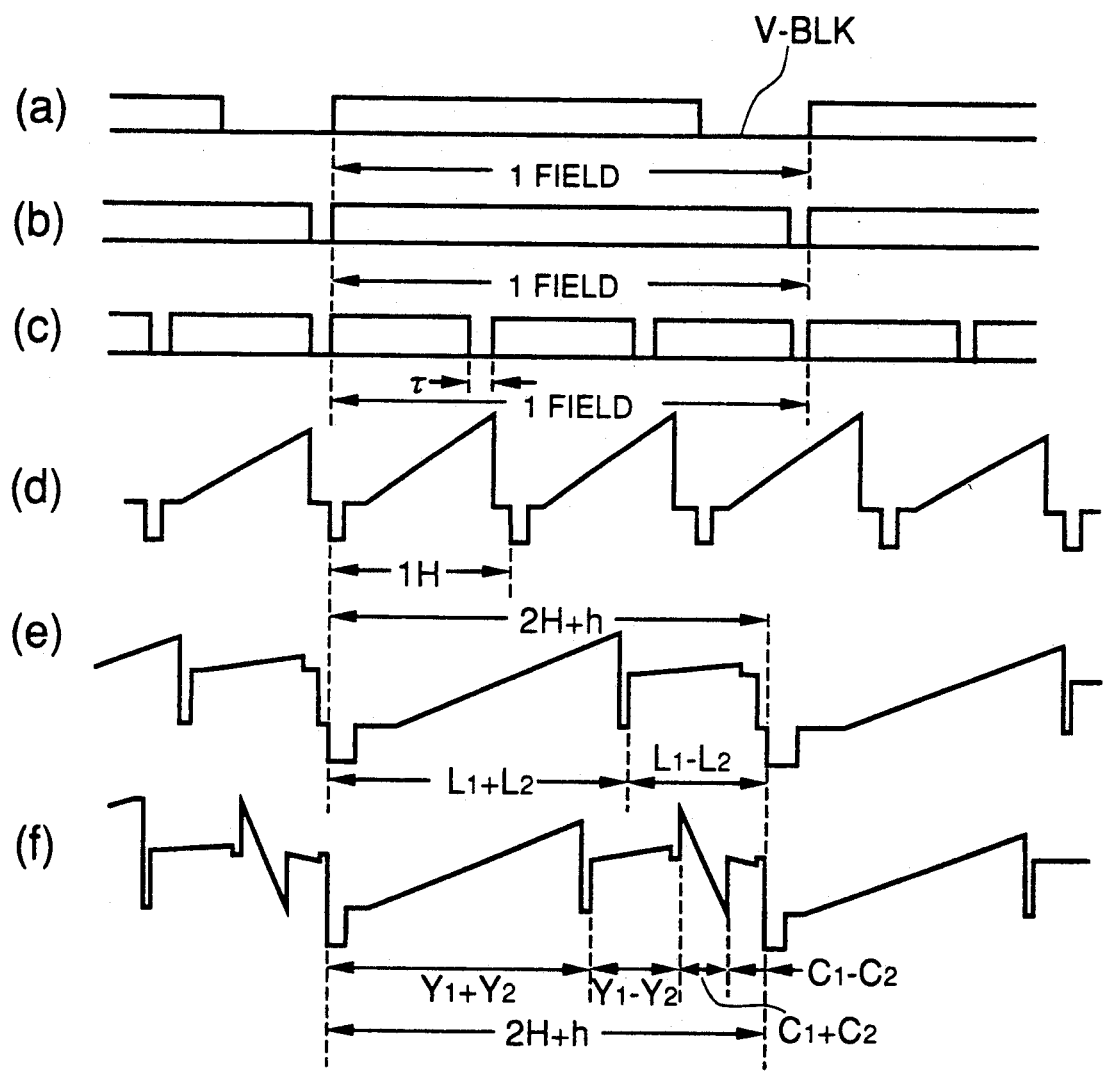
FIG. 6 is a diagram for explaining the block diagram in FIG. 5.

The above has explained the embodiment in which the time base extended sum signal and the time base compressed difference signal are multiplexed within a time of two H (two horizontal scanning periods). This time for multiplexing can be longer than the two horizontal scanning periods. A waveform diagram based on the embodiment of the latter case is shown in FIG. 6. FIG. 6(a) shows a waveform diagram of an input video signal expressed in the field rate. As illustrated in FIG. 6(a), there is a redundant period corresponding to a vertical blanking period (V-BLK) within one field. It is possible to distribute this redundant period to each line, to have a long time for each one line, longer than two horizontal scanning periods. As shown in FIG. 6(b), it is possible to divide the signal into a plurality of segment blocks per one field (three segment block in the present embodiment) and to generate a recording signal having a predetermined redundant period $\tau$ between each of the divided segment blocks. Waveform digrams of each line within each segment block are shown in FIGS. 6(d) and 6(e). FIG. 6(e) shows the state that a time base extended sum signal ($L_1+L_2$) and a time base compressed difference signal ($L_1-L_2$) are timesharing multiplexed to a period (2H+h) which is longer than 2H (two horizontal scanning periods). By this arrangement, it is possible to make the proportion of the time base extension of the sum signal longer than that of the embodiment shown in FIG. 2 and to make the proportion of the time base compression of the difference signal smaller than that of the embodiment shown in FIG. 2, so that the band of the recording signal can be reduced further. In order to carry out the above processing in the embodiment of FIG. 5, the write control circuit 303 controls such that only the video signal excluding the above redundant vertical blanking period is written in the FIFO memory 302 that is used for the time base conversion. In the case of recording the video signal by dividing it into two or more segments, for example, three segments, the signal may be recorded by time base shifting the effective period of the video signal in the segment block unit and by providing a redundant period $\tau$ between the segment blocks to be divided, as shown in FIG. 6(c).

In this case, in the embodiment shown in FIG. 5, the read control circuit 304 controls such that the signal is read in each segment block unit described above from the FIFO memory 302 and the reading from the memory is temporarily stopped for a predetermined period ($\tau$) at each end of the reading of each segment block unit so that the above-described redundant period $\tau$ is formed.

This redundant period $\tau$ is used to eliminate a skew (stepped variation of a time base) which is generated when the head is changed over between the segment blocks at the time of reproduction. More specifically, after the rotary heads 7a and 7b have been changed over within the redundant period of $\tau$, the redundant period τ is eliminated and segment block signals are continuously generated by a time base correction circuit not shown in the diagram so that the skew is eliminated. In order to ensure the change-over of the rotary heads at the time of reproduction to eliminate the skew, the video signal is recorded by the rotary heads 5a and 5b at the timing when the redundant period τ is positioned at the overlap section. By this arrangement, the rotary heads are changed over without fail at the time of reproduction within the redundant period τ recorded within the overlap section. It is also possible to have an additional effect by this operation that the skew which has been a problem in the conventional way of recording segments can also be easily eliminated by the present invention.

In the above embodiments, description has so far been made of the case that only one signal, such as a luminance signal, for example, is handled as an input video signal. When a color signal is also to be handled together with the luminance signal at the same time, the color signal is recorded and transmitted by time-sharing multiplexed during the period of 2H+h, following the luminance signal, as shown in FIG. 6(f). As embodiment of the case where the luminance signal Y and the color signal C, which is a line-sequenced color signal of two color signals $P_B/P_R$ or $C_W/C_N$ for each line, are to be recorded by time-sharing multiplexing the luminance signal and the color signal will be explained with reference to the block diagram shown in FIG. 7 and the waveform diagram shown in FIG. 8.

Figure 7:
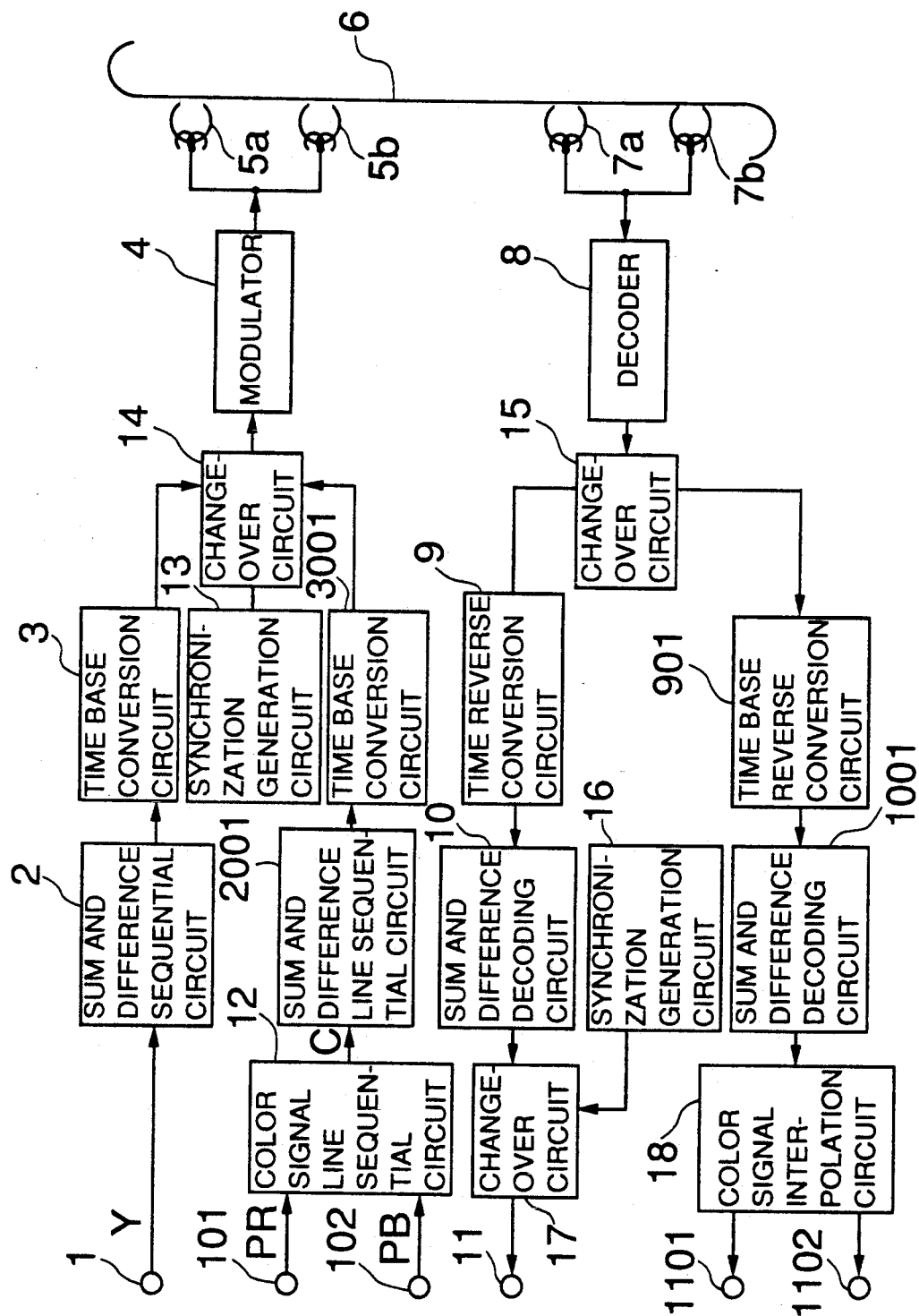
FIG. 7 is a block diagram showing another embodiment of the present invention.
Figure 8:
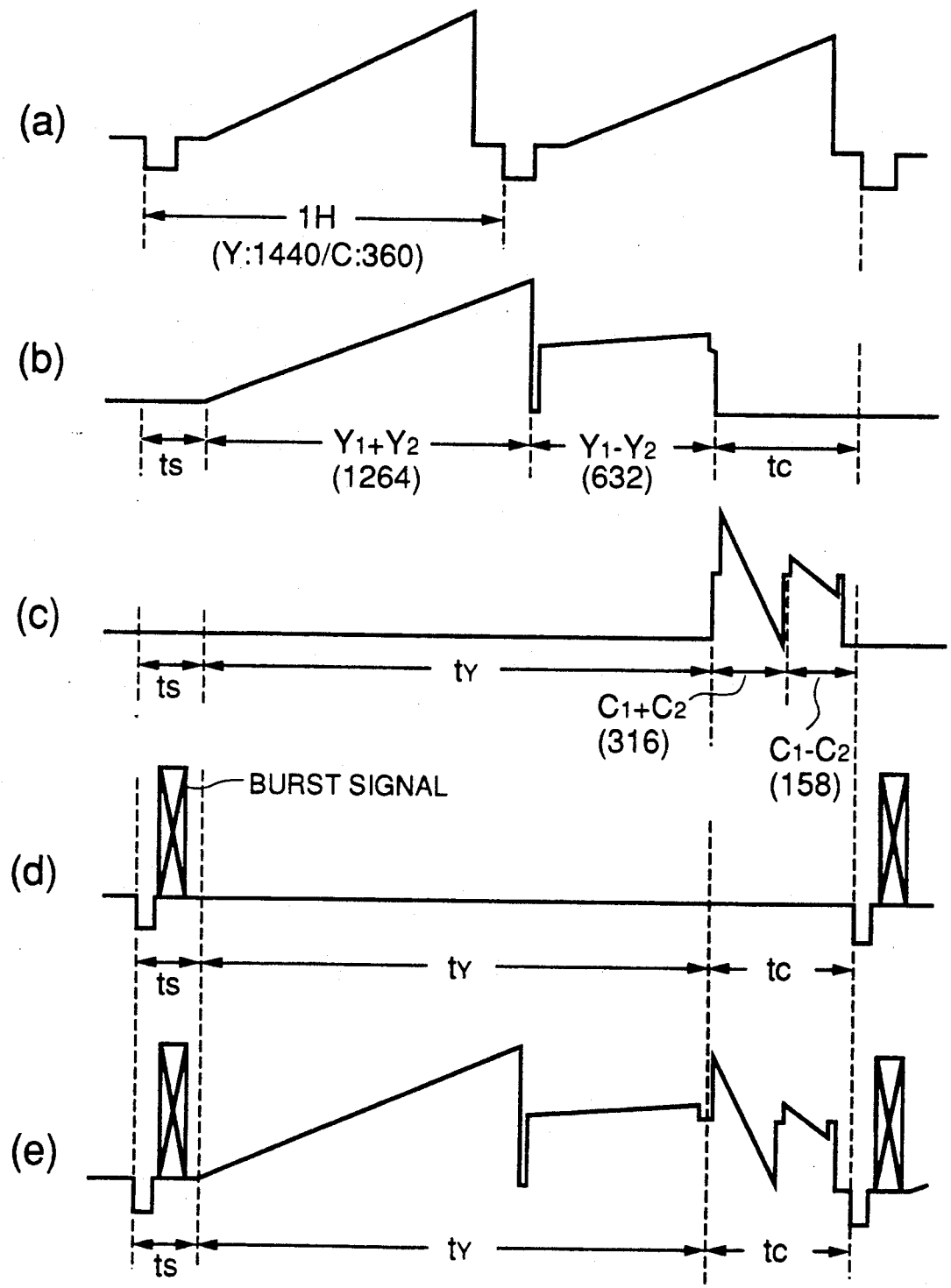
FIG. 8 is a diagram for explaining the operation of the embodiment shown in FIG. 7.

In FIG. 7, 1 designates an input terminal for the luminance signal Y, 101 designates an input terminal for a first color signal PR, and 102 designates an input terminal for a second color signal PB. 2 designates a sum and difference line sequential circuit having the luminance signal Y applied at the input terminal 1 as an input to this circuit, and 12 designates a color signal line sequential circuit for having the first color signal $P_R$ and the second color signal $P_B$ as inputs thereto and for outputting the color signal C which is a result of line sequencing the two input color signals by alternately changing over these signals for each line. 2001 designates a sum and difference line sequential circuit for having the color signal C which has been line sequenced by the color signal line sequential circuit as an input thereto and for outputting line sequentially two lines of the sum signal and the difference signal for the same kind of color signal of either the $P_B$ or $P_R$. 3 designates a time base conversion circuit for converting the time base of the sum signal and the difference signal of the luminance signal Y inputted to the sum and difference line sequential circuit 2. 3001 designates a time base conversion circuit for converting the time base of the sum signal and the difference signal of the color signal C inputted to the sum and difference line sequential circuit 2001. 13 designates a synchronization generation circuit, 14 designates a changeover circuit for changing over the output of the luminance signal Y from the time base conversion circuit 3, the output of the color signal C from the time base conversion circuit 3001 and the output from the synchronization generation circuit 13. 4 designates a modulator for modulating the output from the changeover circuit into a form suitable for the tape head system, 5a and 5b designate recording rotary magnetic heads for recording the modulated signal onto a tape, 6 designates a magnetic tape, and 7a and 7b designate reproduction rotary magnetic heads for reproducing the signal recorded on the magnetic tape 6. 8 designates a demodulator for demodulating the reproduced signal, 15 designates a changeover circuit for changing over and separating the demodulated signal into the luminance signal and the color signal, 9 and 901 designate time base reverse conversion circuits for reverse converting the sum signal and the difference signal of the separated luminance signal and color signal into the original time bases respectively, and 10 designates a sum and difference decoding circuit for converting the sum signal and the difference signal of the time base reverse converted luminance signal into the original state of the video signal. 1001 designates a sum and difference decoding circuit for converting the sum signal and the difference signal of the time base reverse converted color signal into the original first color signal $P_R$ and the second color signal $P_B$ that can be outputted alternately in line unit. 16 designates a synchronization generation circuit for generating a synchronization signal to be added to the luminance signal. 17 designates a changeover circuit for adding the synchronization signal generated in the synchronization generation circuit to the signal which is a result of being converted to the original video signal by the sum and difference decoding circuit 10 and for outputting the result of adding these two signals. 11 designates an output terminal for outputting the luminance signal added with the synchronization signal. 18 designates a color signal interpolation circuit for separating the first color signal $P_R$ and the second color signal $P_B$ from the signal C which is a result of line sequencing the two color signals in line unit and for interpolating the period during which no color signal is outputted with the signals before and after this period so as to produce an output as a continuous signal. 1101 designates an output terminal for the first color signal $P_R$ which has been obtained by separating and interpolating the signal by the color signal interpolation circuit 18, and 1102 designates an output terminal for the second color signal $P_B$ which has been obtained by separating and interpolating the signal by the color signal interpolation circuit 18.

For a luminance signal inputted to the terminal 1, the sum and difference line sequential circuit 2 calculates a sum signal and a difference signal between two mutually adjacent lines within a field and line sequences both signals, as explained in the embodiment shown in FIG. 1. This signal processing is carried out by the circuit comprising the 1H delay circuits 203 and 205, the adder circuit 202, the subtractor circuit 204 and the changeover circuit 206 as shown in FIG. 3. The above line sequential sum signal and difference signal of the luminance signal are inputted to the time base conversion circuit 3 shown in FIG. 7 and the sum signal is time base extended and the difference signal is time compressed by this circuit 3. In this case, as shown in the waveform diagram shown in FIG. 8(b), the time base conversion circuit 3 processes only the effective period excluding the horizontal blanking period of the video signal to generate a first blanking signal of a predetermined period ts, and then time base converts the time base extended sum signal of the luminance signal, the time base compressed difference signal of the luminance signal and a second blanking signal of a predetermined period tc so that they are continuously outputted during a 2H period. This time base conversion circuit 3 comprises the FIFO memory 302, the write control circuit 303 and the read control circuit 304 as shown in FIG. 5. When the sum and difference line sequential circuit 2 is structured by an analog circuit, an A/D converter converts the output of the sum and difference line sequential circuit into a digital signal and then applies the result to the FIFO memory 302. It may also be good to convert the luminance signal applied to the terminal 1 into a digital signal by the A/D converter, output the sum signal and the difference signal line sequentially by the sum and difference line sequential circuit 2 structured by the digital circuit, and apply the output of the sum and difference line sequential circuit 2 to the FIFO memory 302 in the form of a digital signal. As explained in the above embodiments, the time base of the sum signal is extended and the time base of the difference signal is compressed by controlling the write of data into the FIFO memory 302 and read of data from the FIFO memory 302 independent of each other. In this case, in order to obtain the blanking signal of the above periods ts and tc, the read cycle of the FIFO memory 302 is controlled faster than the preceding embodiments after writing only the effective period of the sum signal and the difference signal in the FIFO memory 302. For example, in the system for sample-processing one horizontal scanning period by using 1440 samples, effective samples of 1264 samples which is a result of deducting 176 samples of a horizontal blanking period from the 1440 samples of the sum signal are all written as data to the FIFO memory 302, assuming the number of samples for the horizontal blanking period is 176. The effective 1264 samples of the difference signal are reduced at the rate of one sample per two samples so that total 632 samples which is a half of the overall effective samples are written as data to the FIFO memory 302. Accordingly, data of 1896 samples (1264+632=1896) is written during the 2H period of the line sequenced sum signal and difference signal. In the mean time, at the read side of the FIFO memory 302, the reading is temporarily suspended during the period ts and the first blanking signal is generated. Then data is read sequentially in a constant period at a rate of speed faster than the rate of 1896 samples per 2H period, for example, at the rate of 2500 samples per 2H period. The reading operation is temporarily suspended after all the 1896 sample data written during the 2H period has been read. Then the second blanking signal is generated. The period of suspending the second blanking signal corresponds to the period tc for multiplexing the color signal. By the above processing, the sum signal of the luminance signal is time base extended by 1.15 ($1440 \times 2/2500 = 1.15$) and the difference signal is time base compressed to 1/1.74 ($720 \times 2/2500 = 1/1.74$), and further it is possible to obtain the period ts for multiplexing the synchronization signal and the period tc for multiplexing the color signal.

The two color signals PR and PB inputted to the terminal 101 and the terminal 102 are line sequenced by the color signal line sequential circuit 12 so that the PR and PB appear alternately for each line. In this case, the respective color signals are reduced at the rate of one line per two lines. In order to prevent the occurrence of a distortion due to aliasing due to this reduction processing, the pre-filter processing circuit provided inside the color signal line sequential circuit 12 carries out a band control processing in the vertical direction before the color signals are line sequenced. For the color signal C of which two kinds of color signals PB and PR have been line sequenced, the sum and difference line sequential circuit 2001 calculates the sum signal and the difference signal between two lines of the same kind of color signal for the PB and PR respectively and then line sequences the signals. For example, for the color signal C that is inputted in the order of $PR_1$, $PB_2$, $PR_3$, $PB_4$, $PR_5$, $PB_6$, ..., the signal is line sequenced such that sum and difference of the PR signal and sum and difference of the PB signal are line sequenced in the order of $PR_1+PR_3$, $PR_1-PR_3$, $PB_2+PB_4$, $PB_2-PB_4$, ... The above line sequential sum signal and difference signal of the color signal C are inputted to the time base conversion circuit 3001 in FIG. 7 so that only the effective period excluding the horizontal blanking period is time base converted and the result is outputted. In this case, the time base conversion circuit 3001 generates a third blanking signal of the period ts and a fourth blanking signal of the period ty and then time base converts the signals so that the time base compressed sum signal ($C_1+C_2$) of the color signal C and the time base compressed difference signal $C_1-C_2$) of the color signal C are produced during the 2H period, as shown in the waveform diagram in FIG. 8(c). The time base conversion circuit 3001 comprises the FIFO memory 302, the write control circuit 203 and the read control circuit 304 as shown in FIG. 5 in the same manner as the time base conversion circuit 3. When the sum and difference line sequential circuit 2001 is structured by an analog circuit, the output of the sum and difference line sequential circuit is converted into a digital signal by an A/D converter and the result is inputted to the FIFO memory 302. It may also be arranged such that after the two color signals inputted to the terminal 101 and the terminal 102 have been converted into digital signals, the color signal line sequential circuit 12 and the sum and difference line sequential circuit 2001 structured by digital circuits process these signals and apply the output of the sum and difference line sequential circuit 2001 to the FIFO memory 302 in the form of a digital signal. It may also be good to structure the color signal line sequential circuit 12 by an analog circuit and an A/D converter converts the output of the color signal line sequential circuit into a digital signal and a digital circuit carries out the subsequent signal processings. The maximum frequency of the color signal C is about $\frac{1}{2}$ to $\frac{1}{4}$ of the maximum frequency of the luminance signal Y. Therefore, the sampling frequency for converting an analog signal into a digital signal may be about $\frac{1}{2}$ to $\frac{1}{4}$ of the sampling frequency of the luminance signal. For example, in the system for sample-processing one horizontal scanning period of the luminance signal by using 1440 samples, one horizontal scanning period of the color signal may be processed by using 360 samples (1440/4=360) when the maximum frequency of the color signal is $\frac{1}{4}$ of the maximum frequency of the luminance signal. In this system, the time base conversion circuit 3001 of the color signal carries out the following processing for the line sequenced sum signal and difference signal.

During the period while the sum signal ($PR_{4m-3}+PR_{4m-1}$ or $PB_{4m-2}+PB_{4m}$) is being applied to the FIFO memory 302, 316 samples of the effective period after excluding the horizontal blanking period 44 (176/4 sample=44) from 360 samples of the sum signal are all written as data to the FIFO memory 302, and during the period while the difference signal ($PR_{4m-3}$ $PR_{4m-1}$ or $PB_{4m-2}-PB_{4m}$) is being applied to the FIFO memory 302, the 316 effective samples are reduced at the rate of one sample per two samples so that 158 samples in total are written as data to the FIFO memory 302. Accordingly, 474 sample data (316+158=474) are written during the 2H period of the line sequenced sum signal and the difference signal. On the other hand, at the read side of the FIFO memory 302, reading is temporarily suspended during the period ts and the period $t_y$ of the 2H period, and then data is read sequentially in a constant cycle at a rate of speed faster than 474 samples per 2H, for example, at a rate of 2500 samples per 2H, so that all the data of 474 samples written during the 2H period is read. By the above processing, the sum signal and the difference signal of the color signal can be time base compressed to 1/3.47 (360×2/2500=1/3.47) and 1/6.94 (180×2/2500=1/6.94) respectively, and further the time ts for multiplexing the synchronization signal and the period $t_y$ for multiplexing the luminance signal can also be obtained.

By the signal processing explained above, a signal which is a result of time base conversion and time base multiplexing of the sum signal and the difference signal of the luminance signal during the period $t_y$ as shown in FIG. 8(b) is obtained as an output of the luminance signal from the time base conversion circuit 3, and a signal which is a result of time base conversion and time base multiplexing of the sum signal and the difference signal of the color signal during the period tc as shown in FIG. 8(c) is obtained as an output of the color signal from the time base conversion circuit 3001. The synchronization generation circuit 13 shown in FIG. 7 generates a synchronization signal including the burst signal and the negative polarity synchronization signal as shown in FIG. 8(d). The output of the luminance signal from the time base conversion circuit 3, the output of the color signal from the time base conversion circuit 3001 and the output of the synchronization generation circuit 13 are all inputted to the changeover circuit 14. The changeover circuit 14 selects the output from the synchronization circuit 13 during the period ts, selects the output of the luminance signal from the time base conversion circuit 3 during the period $t_y$ and selects the output of the color signal from the time base conversion circuit 3001 during the period tc, and produces an output respectively. Accordingly, a signal which is a result of time base multiplexing in the order of the negative polarity synchronization signal, the burst signal, the sum signal and the difference signal of the luminance signal, and the sum signal and the difference signal of the color signal, as shown in FIG. 8(e), is obtained as an output from the changeover circuit 14. Of the four kinds of signals including the sum signal and the difference signal of the luminance signal and the sum signal and the difference signal of the color signal, the sum signal of the luminance signal is time base extended by 1.15 times and the sum signal of the color signal is time base compressed to 1/3.47 in the above embodiment respectively, so that the ratio of the multiplexing period of the sum signal of the luminance signal to the sum signal of the color signal is 4:1. Accordingly, the sum signal of the color signal is time base compressed to ¼ of the sum signal of the luminance signal. In the above embodiment, the maximum frequency of the color signal is ¼ of the maximum frequency of the luminance signal. Therefore, the maximum frequency of the sum signal of the luminance signal after the time base conversion becomes equal to the maximum frequency of the sum signal of the color signal, so that the signal transmission band can be utilized effectively. For both the luminance signal and the color signal, the ratio of the multiplex period of the sum signal to the multiplex period of the difference signal is 2:1 respectively (1.15:1/1.74, 1/3.47:1/6.94), and the maximum frequency of the difference signal is limited to ½ of the maximum frequency of the sum signal. However, only the resolution characteristics in the oblique direction are deteriorated and it is possible to transmit a video signal with a high fidelity without substantial deterioration of the picture quality as explained in the embodiment shown in FIG. 1. On the other hand, since the sum signal of the luminance signal is time base extended by 1.15 times, it is possible to reduce the maximum frequency of the recording signal to 1/1.15 of the maximum frequency of the luminance signal. As described above, it is possible to record and transmit color signals efficiently by a single channel without providing a separate channel for the color signal, by time base converting and multiplexing the effective period of each of the sum signal and the difference signal of the luminance signal and the sum signal and the difference signal of the color signal by excluding the horizontal blanking period from each signal.

The sum signal and the difference of the luminance signal and the sum signal and the difference signal of the color signal that have been multiplied by the synchronization signal in the changeover circuit 14 are applied to the modulator 4, where the signals are modulated to a signal of the form suitable for the tape head system. The modulator 4 is an analog signal circuit for carrying out frequency modulation or the like. Therefore, when the time base conversion circuits 3 and 3001 are structured by digital circuits, the synchronization generation circuit 13 is also structured by a signal processing circuit of digital format for sequentially reading data corresponding to the synchronization signal from a read-only memory (ROM), so that the output of the digital signal from the changeover circuit 14 is modulated after the output signal has been converted to an analog signal by a D/A converter. When the modulation system performs a digital signal processing such as pulse code modulation, the output of the changeover circuit 14 is processed in the form of the digital signal. The signal which has been modulated by the modulator 4 is recorded on the magnetic tape 6 by the rotary recording magnetic heads 5a and 5b.

At the time of a reproduction, the signal which has been reproduced from the magnetic tape 6 by the rotary reproduction magnetic heads 7a and 7b is demodulated by the demodulator 8, and a time base multiplexed signal of the negative polarity synchronization signal, the burst signal, the sum signal of the luminance signal that has been time base extended by 1.15 times, the difference signal of the luminance signal that has been time base compressed to 1/1.74, the sum signal of the color signal that has been time base compressed to 1/3.47 and the difference signal of the color signal that has been time base compressed to 1/6.94, is obtained as shown in FIG. 8(e). The output of the demodulator 8 is inputted to the changeover circuit 15, and the signal is changed over such that the output of the demodulator 8 is applied to the time base reverse conversion circuit 9 of the luminance signal during the period $t_y$ while the sum signal and the difference signal of the luminance signal are being reproduced and the output of the demodulator 8 is applied to the time base reverse conversion circuit 901 of the color signal during the period tc in which the sum signal and the difference signal of the color signal are being reproduced.

The time base reverse conversion circuits 9 and 901 reverse convert the time base extended or compressed sum signal or difference given by the changeover circuit 15 into the original time base signals. The time base reverse conversion circuits 9 and 901 comprise the FIFO memory 302, the write control circuit 303 and the read control circuit 304 shown in FIG. 5, and perform the signal processing of the function almost opposite to that of the time base conversion circuits 3 and 3001. The time base reverse conversion circuits 9 and 901 sample-process the output signal from the demodulator 8 by using 2500 samples during the period of the multiplexed negative polarity synchronization signal (2H), write the 1264 samples of the sum signal and 632 samples of the difference signal of the luminance signal respectively in the FIFO memory 302 of the time base reverse conversion circuit 9, and write the 316 samples of the sum signal of the color signal and 158 samples of the color signal in the FIFO memory 302 of the time base reverse conversion circuit 901. The read control circuit 304 of the time base reverse conversion circuit 9 of the luminance signal reads all the samples of the sum signal from the FIFO memory 302 and interpolates the difference signal by interpolating the samples, that have been reduced at the rate of one sample per two samples, by the samples adjacent to these samples, and outputs the signals sequentially at the rate of 1440 samples during 1H period. In this case, reading is suspended during the period corresponding to the horizontal blanking period. By the above processing, the sum signal is time base compressed to 1/1.15 (2500/(1440×2)=1/1.15) and the difference signal is time base extended by 1.74 (2500/(720×2)=1.74), and the signals are reverse converted to the original time base. Similarly, for the color signal, the read control circuit 304 of the time base reverse conversion circuit 901 of the color signal reads all the samples of the sum signal of the color signal from the FIFO memory 302 and interpolates the difference signal, that has been reduced at the rate of one sample per two samples, by the samples adjacent to these samples, and outputs the signals sequentially at the rate of 360 samples during 1H period. Reading is suspended during the period corresponding to the horizontal blanking period, as is the case with the processing of the luminance signal. By the above signal processing, the sum signal and the difference signal of the color signal are time base extended by 3.47 (2500/(360×2)=3.47) and 6.94 (2500/(180×2)=6.94), respectively, and the signals are reverse converted to the original time base. As described above, the time base reverse conversion circuits 9 and 901 of the luminance signal and the color signal produce outputs of the time base converted sum signals and difference signals line sequentially, with alternate outputs of the sum signal and the difference signal in each 1H period.

The output of the luminance signal from the time base reverse conversion circuit 9 is converted to the original state of the video signal by the sum and difference decoding circuit 10, and the standard synchronization signal generated by the synchronization generation circuit 16 is added to the horizontal blanking period by the changeover circuit 17 and the output is produced from the terminal 11. The output of the color signal from the time base conversion circuit 901 is converted such that two color signals PR and PB are alternately produced at every 1H from the sum and difference decoding circuit 1001. Then the color signal interpolation circuit 18 separates the two color signals PR and PB and produces outputs from the terminals 1101 and 1102 respectively by interpolating the signals by the signals before and after the line as continuous signals while the two color signals are not being outputted.

In the above embodiment, description has been made of the case where the sum signal and the difference of the luminance signal and the sum signal and the difference signal of the color signal have been time base multiplexed continuously. However, the processing is not limited to the above method in the present invention, and it may also be good to process such that the reading of the FIFO memory is temporarily suspended at every end of the reading of each of the signals by having a redundant guard period of several samples for each of the signals (for example, two samples, four samples or eight samples as a power of two). By this arrangement, even if a transient distortion of a waveform occurs in each signal period in the transmission system, it is possible to prevent the distortion from being extended to the other signal during the guard period.

In the above embodiment, the sum signal and the difference signal of the luminance signal and the sum signal and the difference signal of the color signal are time base converted in accordance with the respective necessary transmission bands, and the negative polarity synchronization signal and the burst signal which become the basis of the time base or the level for the signal processing at the time of reproduction are multiplexed within the 2H period. It may also be good to multiplex the signals during the period larger than 2H (that is, 2H+h) by reducing the vertical blanking period in the same manner as that for the embodiment shown in FIG. 6.

In the above embodiment, the maximum frequency of the color signal is ¼ of the maximum frequency of the luminance signal and the difference signal is time base compressed to ½ of the sum signal. Accordingly, the ratio of the total four kinds of multiplex period for the sum signal and the difference signal of the luminance signal and the sum signal and the difference signal of the color signal is 8:4:2:1. Since the ratio can be expressed by the power of 2, the circuits including the control circuit for the digital signal processing can be simplified extremely and there is an economic effect due to reduction of the circuit scale. Without limiting to the above ratio, it is also possible to reduce the band for recording and transmitting the signals without substantially deteriorating the picture quality by setting the ratio of the maximum frequency $W_c$ of the color signal and the maximum frequency $W_Y$ of the luminance signal to be equal to the ratio of the multiplex period of the sum signal of the color signal and the multiplex period of the sum signal of the luminance signal, or by multiplexing each signal by time base converting the signals such that the multiplex period of the respective sum signals is shorter than the multiplex period of the respective sum signals.

As shown in the embodiment in FIG. 1, when a time base variation is included in the reproduction signal to be demodulated in the demodulation circuit, the time base variation included in the reproduction signal can be eliminated by making the write control signal of the FIFO memory to be used in the time base reverse conversion circuits 9 and 901 of the luminance signal and the color signal follows the time base variation of the reproduction signal. In this case, the write control signal of the FIFO memory is generated based on the signal which becomes the time base standard of the burst signal, etc. which is included in the reproduction signal.

In the above embodiment, description has been made of the case where signals in mutually adjacent two lines in one field are processed. It may also be good that signals in mutually adjacent two lines between fields or between frames are processed. For example, lines in the first field are expressed as $L_{1\cdot 1}$, $L_{1\cdot 2}$, $L_{1\cdot 3}$, $L_{1\cdot 4}$, ... and lines in the second field are expressed as $L_{2\cdot 1}$, $L_{2\cdot 2}$, $L_{2\cdot 3}$, In other words, an M-th line of an N-th field is expressed as $L_{M\cdot N}$. In the embodiment explained above, signal processing has been carried out for two sets of signals such as $L_{1\cdot 1}$ and $L_{1\cdot 2}$, $L_{1\cdot 3}$ and $L_{1\cdot 4}$, ... and $L_{N\cdot 2m-1}$ and $L_{N\cdot 2m}$, ..., which are signals of mutually adjacent two lines within the same field. It may also be good to process two sets of signals such as $L_{1\cdot 1}$ and $L_{1\cdot 2}$, $L_{1\cdot 2}$ and $L_{2\cdot 2}$, ..., $L_{2n-1\cdot M}$ and $L_{2n\cdot M}$, which are signals of mutually adjacent two lines between field. It may also be good to process two sets of signals such as $L_{1\cdot 1}$ and $L_{3\cdot 1}$, $L_{1\cdot 2}$ and $L_{3\cdot 2}$, ..., $L_{4n-3\cdot m}$ and $L_{4n-1\cdot M}$, $L_{2\cdot 1}$ and $L_{4\cdot 1}$, $L_{2\cdot 2}$ and $L_{4\cdot 2}$, ..., $L_{4n-2\cdot M}$ and $L_{4n\cdot M}$, ..., which are signals of mutually adjacent two lines between frames. In the processing of signals for mutually adjacent two lines within one field explained in the above embodiment, two dimensional signal processing of horizontal and vertical for the signals within one field has been carried out. It is possible to minimize deterioration of picture quality of the still image section having high correlation on the time base by expanding the signal processing to three-dimensional signal processing including the time base, such as the signal processing for adjacent signals between fields or between frames.

In the embodiment explained above, for the two color signals PR and PB that are inputted sequentially, the PR is selected in an odd-number line and the PB is selected in an even-number line so that the signals are processed in line sequence and then the sum and the difference are calculated based on two lines of a color signal of the same kind. In other words, the first color signals inputted in the order of $PR_1$, $PR_2$, $PR_3$, $PR_4$, ..., $PB_N$, ... and the second color signals inputted in the order of $PB_1$, $PB_2$, $PB_3$, $PB_4$, ..., $PB_N$, ... are line sequenced in the order of $PR_1$, $PB_2$, $PR_3$, $PB_4$, ..., $PR_{2n-1}$, $PB_{2n}$, ..., and two-line signals are processed in the order of $PR_1$ and $PR_3$, $PB_2$ and $PB_4$, $PR_5$ and $PR_7$, $PB_6$ and $PB_8$, ..., $PR_{4m-3}$ and $PR_{4m-1}$, $PB_{4m-2}$ and $PB_{4m}$, ... It may also be good that the PB is selected at an odd-number line and the PR is selected at an even-number line and so that the signals are processed in line sequence and then the similar processing is carried out. It may also be good that the first signals inputted in the order of $PR_1$, $PR_2$, $PR_3$, $PR_4$, ..., $PR_N$, ... and the second signals inputted in the order of $PB_1$, $PB_2$, $PB_3$, $PB_N$, ... are line sequenced in the order of $PR_1$, $PR_2$, $PB_3$, $PB_4$, $PR_5$, $PR_6$, $PB_7$, $PB_8$, ..., $PR_{4m-3}$, $PR_{4m-2}$, $PB_{4m-1}$, $PB_{4m}$, ..., and two-line signals are processed such as $PR_1$ and $PR_2$, $PB_3$ and $PB_4$, .., $PR_{4m-3}$ and $PR_{4m-2}$, $PB_{4m-1}$ and $PB_{4m}$. ... It may also be good that, in the manner similar to that in the above embodiment, the signals are line sequenced in the order of $PR_1$, $PB_2$, $PR_3$, $PB_4$, ..., $PR_{2n-1}$, $PB_{2n}$, ... and sum and difference are calculated for two-line signals comprising the PR and PB in the order of $PR_1$ and $PB_2$, $PR_3$ and $PB_4$, $PR_{2n-1}$ and $PB_{2n}$ ...

In the above embodiment, after two kinds of color signals have been line sequenced, sum and difference calculations are carried out between color signals of the same kind and the signals are time base converted and multiplexed with the luminance signal. It may also be good that instead of line sequentially processing two color signals, signal processing is carried out between two adjacent lines similar to the luminance signal and sum signals and difference signals of the first and second color signals respectively are multiplexed with the luminance signal. In other words, following the sum signal and the difference signal of the luminance signal, total six kinds of signals including the sum signal and the difference signal of the first color signal and the sum signal and the difference signal of the second color signal are time base converted in accordance with the maximum frequency of each signal and then they are time base multiplexed. In this case, the ratio of the multiplex period of the sum signals of the first and second color signals respectively with the luminance signal may be set to be equal to the ratio of the maximum frequencies of these signals. For example, when the maximum frequency of the luminance signal is 21 MHz, the maximum frequency of the first color signal is 7 MHz and the maximum frequency of the second color signal is 5.5 MHz, the ratio of the multiplex period of the sum signals for the luminance signal and the first and second color signals respectively may be set to 12:4:3 (=21:7:5.5). The ratio of the sum signal and the difference signal for each signal may be set to 2:1 or 3:1 in the same manner as the above embodiment.

Figure 9:
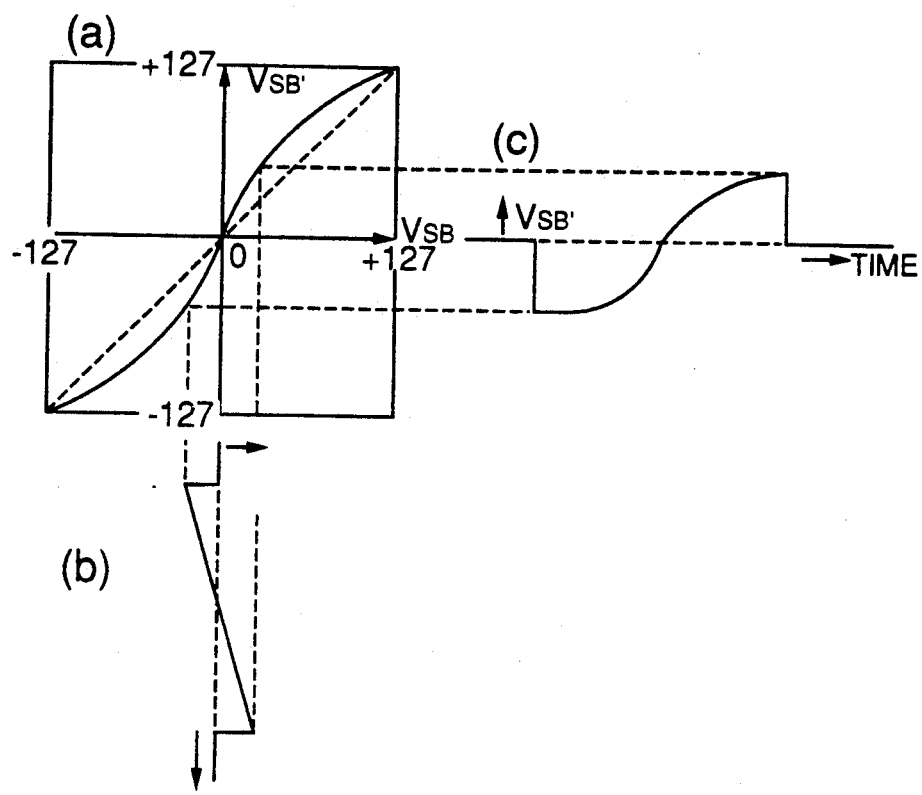
FIG. 9 is a diagram for explaining the level conversion of a difference signal.

In the processing unit or the magnetic recording and reproducing unit of video signals according to the present invention, video signals are recorded and transported after being converted into sum signals and difference signals for every two lines, and at the time of reproduction, the video signals of two lines are decoded from the sum signals and difference signals. In the case of general video signals, signals of adjacent lines are similar in many cases at portions other than the horizontal edge portions. Therefore, the level of a difference signal between the lines is small. On the other hand, at the time of a reproduction of a signal, video signals of two lines are reproduced by addition and subtraction of the sum signals and difference signals as shown in the expressions (7) and (8). Therefore, the video signal to be reproduced is influenced by the noise which is superposed on the sum signal and the noise which is superposed on the difference signal. It is possible to reduce the noise of the difference signal by recording and transmitting the signal by changing the gain of the difference signal according to the level 1 of the difference signal such that the gain is large when the level of the difference signal is low and the gain is small when the level of the difference signal is high. The signal processing in the case of using the above-described signal processing will be explained with reference to the characteristics diagram in FIG. 9.

FIG. 9(a) shows the characteristics of nonlinear function for converting the level of the difference signal $V_{SB}$ to the level of $V_{SB}'$, FIG. 9(b) shows the difference signal $V_{SB}$ which is obtained by calculating two lines of video signals and FIG. 9(c) shows the recording signal that has been level converted by the linear function. The gradient of this non-linear function shows the ratio of the level of an input signal to the level after the level conversion, that is, the gain. The gain is set such that the gain is larger than 1 when the input level is low and the gain is smaller than 1 when the input level is high. The full-scale value after the level conversion is set to be equal to the full-scale value of the input difference signal. By this non-linear function, the difference signal of a small amplitude as shown in FIG. 9(b) is level converted to have a large amplitude as shown in FIG. 9(c)

and then the result is recorded. At the time of reproduction, the reproduction signal as shown in FIG. 9(c) is reverse converted to have a small amplitude as shown in FIG. 9(b) by the reverse conversion characteristics having the function opposite to the non-linear function at the time of the conversion. In this case, the amplitude of the noise component included in the reproduction signal is also restricted at the same time, so that the video signal to be decoded is less influenced by noise. Such a non-linear function as described above can be easily realized by the non-linear characteristics of the diode, etc. When the present signal processing unit is to be realized by the digital signal processing, the output value corresponding to each input level of the non-linear function is written in the read-only memory (ROM) in advance, the input signal data is connected to the address of this ROM and the data output from the ROM is set as the data after the level conversion. By this arrangement, it is possible to set the conversion characteristics and reverse conversion characteristics at desired values and a non-linear function with high conversion precision can be easily realized in a small-scale circuit. The level conversion by the non-linear function will be explained for the embodiment of the sum and difference line sequential circuit in FIG. 1 with reference to FIG. 10.

Figure 10:
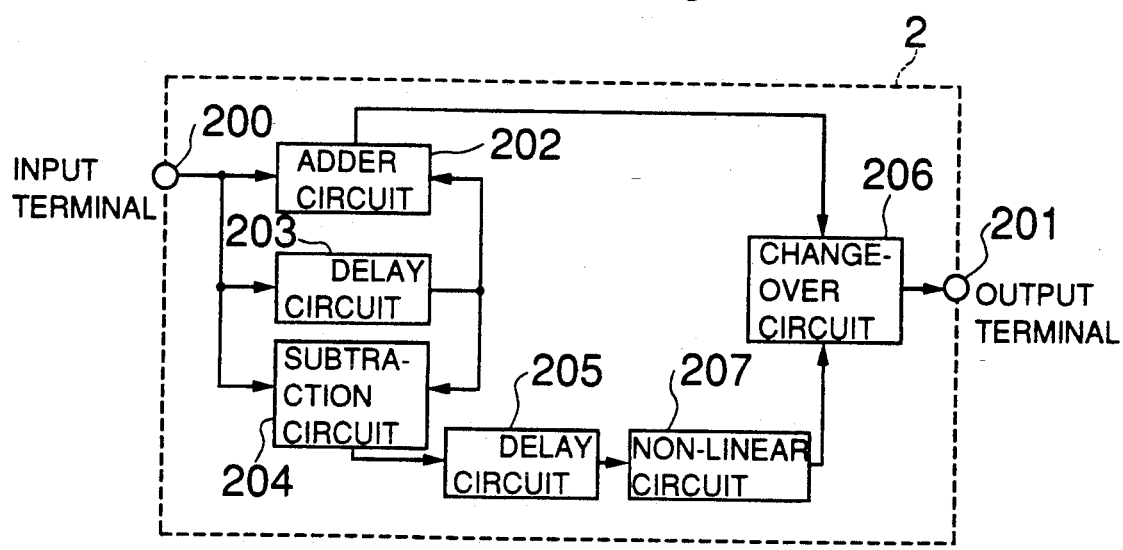
FIG. 10 is a block diagram showing the embodiment of the sum and difference sequential circuit shown in FIG. 1.

FIG. 10 shows an embodiment of the case where the above-described level conversion by the non-linear function is applied to the embodiment shown in FIG. 3. As compared to the structure shown in FIG. 3, FIG. 10 takes a different structure in that a non-linear circuit 207 comprising a ROM is inserted between the delay line circuit 205 which may be a 1H delay circuit and the changeover circuit 206. A difference signal obtained by the subtraction circuit 204 is delayed by the 1H delay circuit 205 and this signal is level converted by the non-linear circuit 207 and is multiplexed with a sum signal by the changeover circuit 206 and the result is outputted. By the above structure, level conversion by the non-linear function can be applied only to the difference signal. The delay circuit 203 may be a 1H delay circuit.

Alternatively, the delay circuit 203 and 205 may be field or frame delay circuits.

In the above embodiment, processing of a recording signal has been explained. At the time of reproduction, a reverse non-linear circuit having characteristics of the function opposite to the above non-linear function is used in place of the above non-linear circuit 207 in the structure similar to that in FIG. 10, the level of the difference signal reproduced is reverse converted by the reverse non-linear function, and the video signal is decoded by addition and subtraction of the sum signal and the difference signal.

It is possible to reduce the influence of noise which is superposed on the reproduction signal, by having a large amplitude of the difference signal which tends to be concentrated near the zero level before the recording and by reverse converting the signal at the time of reproduction, through the level conversion of the difference signal by the non-linear function.

Next, with reference to FIG. 11, description will be made of an embodiment of the case where a two dimensional filter for smoothing a discontinuity at an oblique edge portion which is generated between a line block for two lines reproduced by a sum signal and a difference signal and a next line block for two lines reproduced by next sum signal and difference signal is applied to a luminance signal.

Figure 11:
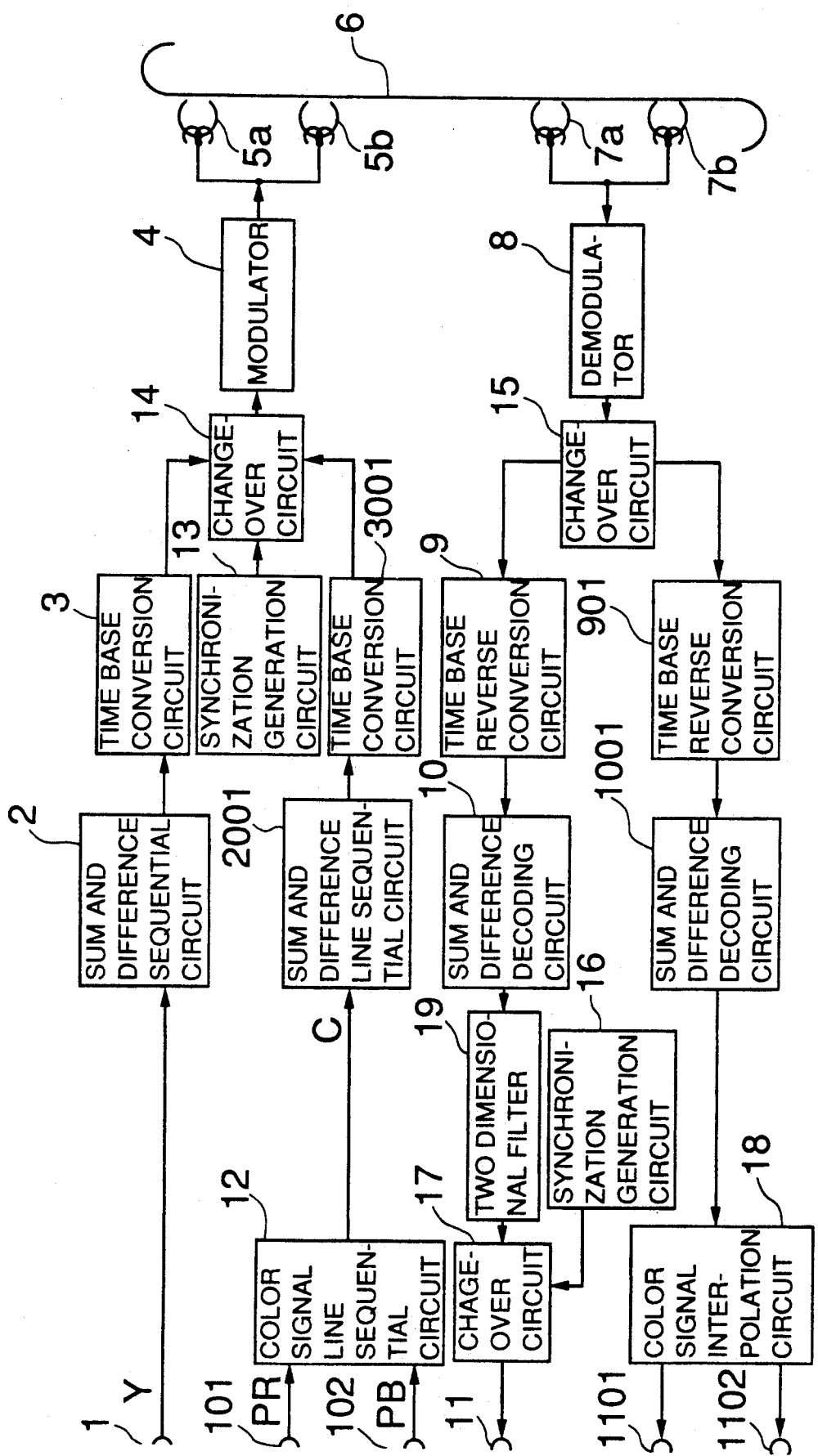
FIG. 11 is a block diagram showing still another embodiment of the present invention.

FIG. 11 has the same structure as that of FIG. 7, except that in FIG. 11 a two-dimensional filter 19 is inserted between the sum signal decoding circuit 10 and the changeover circuit 17 for adding a synchronization signal shown in the embodiment of FIG. 7. A luminance signal which has been converted into the state of an original video signal in the sum signal decoding circuit 10 is inputted to the two-dimensional filter 19, and is inputted to the changeover circuit 17 after edge information between line blocks of two adjacent lines has been smoothed. The input applied to the changeover circuit 17 is added with a synchronization signal and the result is outputted to the terminal 11. By the insertion of this two-dimensional filter 19, the reproduction luminance signal outputted from the output terminal 11 is delayed by a predetermined delay quantity by the two-dimensional filter 19, so that the processing delay time of the luminance signal in the time base conversion circuit 9 is delayed in advance by a predetermined delay quantity. Alternatively, phases of the reproduction outputs of the color signal and the luminance signal may be matched by increasing the processing delay time of the color signal processing in one of the time base conversion circuit 901, the sum and difference decoding circuit 101 and the color signal interpolation circuit 18 to match the increase in the delay time of the luminance signal.

Figure 12:
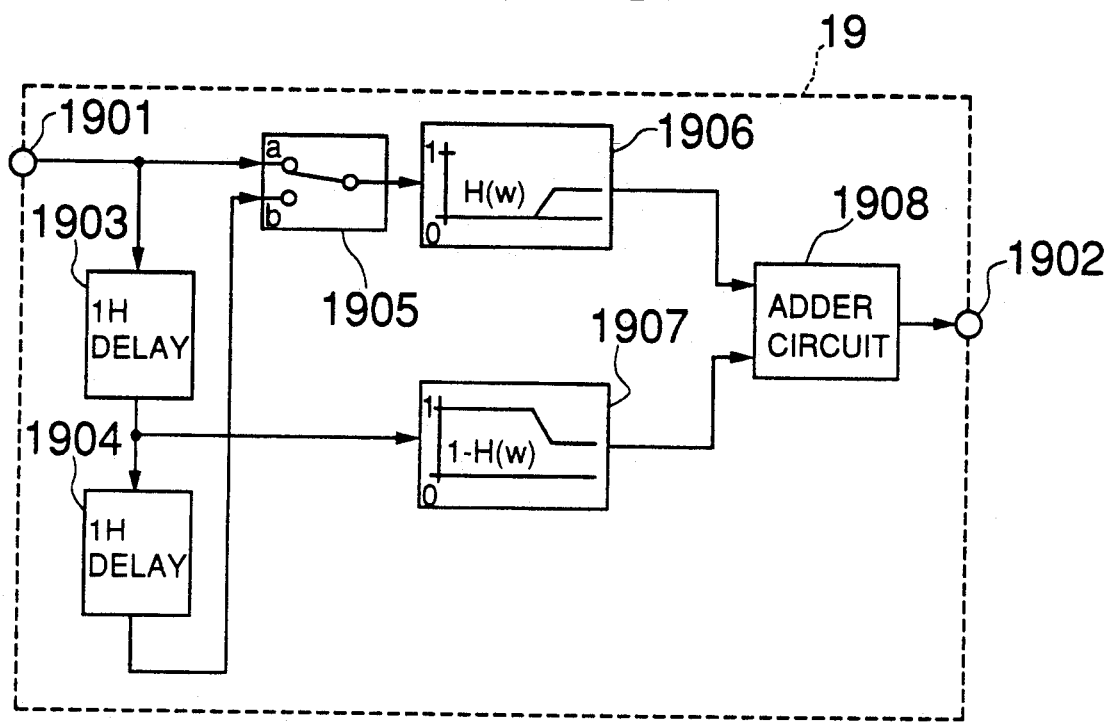
FIG. 12 is a block diagram showing an embodiment of a two-dimensional filter shown in FIG. 11.

A detailed example of the configuration of the two dimensional filter 19 is shown in FIG. 12. In FIG. 12, 1901 designates an input terminal for the video signal of which sum signal and difference signal have been decoded, 1902 designates an output terminal for the video signal which has been filtered, and 1903 and 1904 designate delay circuits for delaying a signal by one horizontal scanning (1H). 1905 designates a changeover circuit, 1906 designates a high-pass filter circuit having frequency characteristics $H(\omega)$, 1907 designates a low-pass emphasizing circuit having frequency characteristics $1-H(\omega)$, and 1908 designates an adder circuit. A video signal of which sum signal and difference signal have been decoded is inputted to the input terminal 1901 and then is inputted to the changeover circuit 1905 and the delay circuit 1903. A signal which has been delayed by 1H by the delay circuit 1903 is inputted to the low-pass emphasizing circuit 1907 and the delay circuit 1904. An output from the delay circuit 1904 is inputted to the changeover circuit 1905. In other words, the input terminal of the changeover circuit 1905 is applied with the input signal from the terminal 1901 and a signal which has been delayed by a total of 2H by the delay circuits 1903 and 1904. The changeover circuit 1905 changes over at every 1H the input signal applied to the input terminal 1901 and the signal which has been delayed by 2H by the delay circuit 1904, and applies the result to the high-pass filter circuit 1906. On the other hand, a signal which is a result of delaying the input signal by 1H by the delay circuit 1903 is applied to the low-pass emphasizing circuit 1907. The output from the low-pass emphasizing circuit 1907 and the output from the high-pass filter circuit 1906 are added by the adder circuit 1908, and the result is produced as an output of the two-dimensional filter 19 from the terminal 1902.

Figure 13:
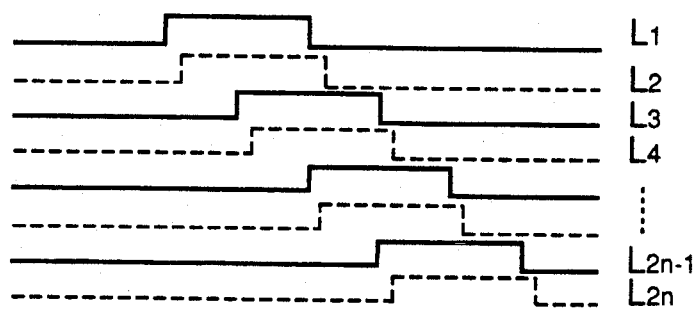
FIG. 13 is a diagram for explaining the block diagram of FIG. 12.

The operation of the two-dimensional filter will be explained next. FIG. 13 shows the waveform diagram of the signal of which sum and difference signals have been decoded to explain the operation. $L_1$, $L_2$, . . . , $L_{2n-1}$ and $L_{2n}$ show the waveforms of the lines of which sum and difference signals have been decoded. $L_k$ shows a k-th line. Two lines of $L_1$ and $L_2$ are decoded by a pair of sum signal and a difference signal by the sum and difference decoding circuit 10, two lines of $L_3$ and $L_4$ are decoded by the next sum signal and difference signal, and lines of $L_{2n-1}$ and $L_{2n}$ are sequentially decoded by a pair of sum signal and a difference signal, and the decoded signals are inputted to the two-dimensional filter 19. If the sum signal and the difference signal are transmitted completely, signals of all the lines should be reproduced completely. However, the transmission band of the difference signal is limited to about ½ to ⅓ of the maximum frequency of the video signal. Therefore, the edge portion of the difference signal, in particular, is not reproduced sufficiently and two-line signals of $L_1$ and $L_2$, $L_3$ and $L_4$ and $L_{2n-1}$ and $L_{2n}$ that are decoded by a pair of a sum signal and a difference signal become similar signals at the edge portion. Accordingly, there may easily occur discontinuities at the edge portions of $L_2$ and $L_3$, $L_4$ and $L_5$, $L_{2n}$ and $L_{2n+1}$, etc., resulting in deterioration of the picture quality at the oblique edge portion. The operation will be explained below by taking an example of the case where the signals of which sum and difference signals have been decoded as shown in FIG. 3 are sequentially inputted to the input terminal 1901. Assume that $L_1$ and $L_2$ have already been inputted sequentially to the terminal 1901 and $L_3$ is currently being inputted to the terminal 1901. A signal which is a result of delaying an input signal by 1H, that is $L_2$, is produced as an output to the delay circuit 1903 and this is inputted to the low-pass emphasizing circuit 1907. The changeover circuit 1905 is changed over to the side a of FIG. 12, and the input signal, that is the signal $L_3$, is selected and is inputted to the high-pass filter circuit 1906. The output of the two-dimensional filter 19 obtained from the output terminal 1902 is a result of adding the output of the low-pass emphasizing circuit 1907 and the output of the high-pass filter circuit 1906. Therefore, this is obtained by slightly attenuating the high-pass component included in $L_2$ and by adding to it the high-pass component of $L_3$. This is a result of adding the signal which is an average of the high-pass components of $L_2$ and $L_3$ to the low-pass component of $L_2$. During the period when $L_4$ is being inputted after $L_3$ has been inputted to the terminal 1901, the changeover circuit 1905 is changed over to the side b in FIG. 12 and a signal which is a result of delaying the input signal by 2H, that is $L_2$, is inputted to the high-pass filter circuit 1906. A signal which is a result of delaying the input signal by 1H by the delay circuit 1903, that is $L_3$, is applied to the low-pass emphasizing circuit 1907. In this case, the output of the two-dimensional filter 19 obtained at the output terminal 1902 is a signal which is obtained by slightly attenuating to high-pass component included in $L_3$ and by adding to it the high-pass component included in $L_2$. This is a result of adding the signal which is an average of the high-pass components of $L_2$ and $L_3$ to the low-pass component of $L_3$. As described above, the changeover circuit 1905 in FIG. 12 is changed over to the side a during the period while odd number lines of $L_1$, $L_3$, ... and $L_{2n-1}$ are being applied to the terminal 1901 and the changeover circuit 1905 is changed over to the side b during the period while even number lines of $L_2$, $L_4$, ... and $L_{2n}$ are being applied to the terminal 1901, so that discontinuity of signals which occurs between a line block of two lines reproduced by a sum signal and a difference signal and a next line block of two lines reproduced by next sum signal and difference signal is reduced by averaging the high-pass components between mutually adjacent line blocks (edge information).

When the two-dimensional filter shown in FIG. 12 is to be realized by digital circuits, the delay circuits 1903 and 1904 can be easily realized by line memories. When the high-pass filter circuit 1906 and the low-pass emphasizing circuit 1907 are realized by transversal filters, a high-pass filter circuit and a low-pass emphasizing circuit having linear phase characteristics and having equal delay time can be easily obtained so that a two-dimensional filter can be realized in a relatively small scale circuit. Although a two-dimensional filter has been applied to only the luminance signal in the embodiment shown in FIG. 11, the two-dimensional filter can also be applied to the color signal. In this case, the two-dimensional filter is inserted between the sum and difference signal decoding circuit 1001 and the color signal interpolation circuit 18 shown in FIG. 11. When the two-dimensional filter is placed in front of the color signal interpolation circuit 18, independent circuits for PB and PR respectively are not necessary but only one circuit is necessary to carry out simultaneous processing of the color signals PB and PR so that there is an economic effect. In this case, the two-dimensional filter may be structured such that the delay circuits 1903 and 1904 shown in FIG. 12 which are shown as an example of the configuration of the two-dimensional filter for the luminance signal are modified to have a delay time of two horizontal scanning period (2H) from one horizontal scanning period (1H).

The high-pass filter circuit 1906 shown in FIG. 12 may have characteristics for detecting edge information of the video signal and may have band-pass characteristics without being limited to the circuit of high-pass filter characteristics. In this case, when the frequency characteristics of the high-pass filter circuit 1906 is $H(\omega)$, the low-pass emphasizing circuit 1907 may have such complementary characteristics that the frequency characteristics of the circuit 1907 is $1-H(\omega)$.

Noise which is superposed on the color signal by being transmitted in a lower band than the band of the luminance signal is distributed in a lower frequency component and becomes a large factor for deteriorating picture quality. Thus, with reference to FIG. 14, description will be made of an embodiment of the case where a noise elimination circuit is applied to the color signal.

Figure 14:
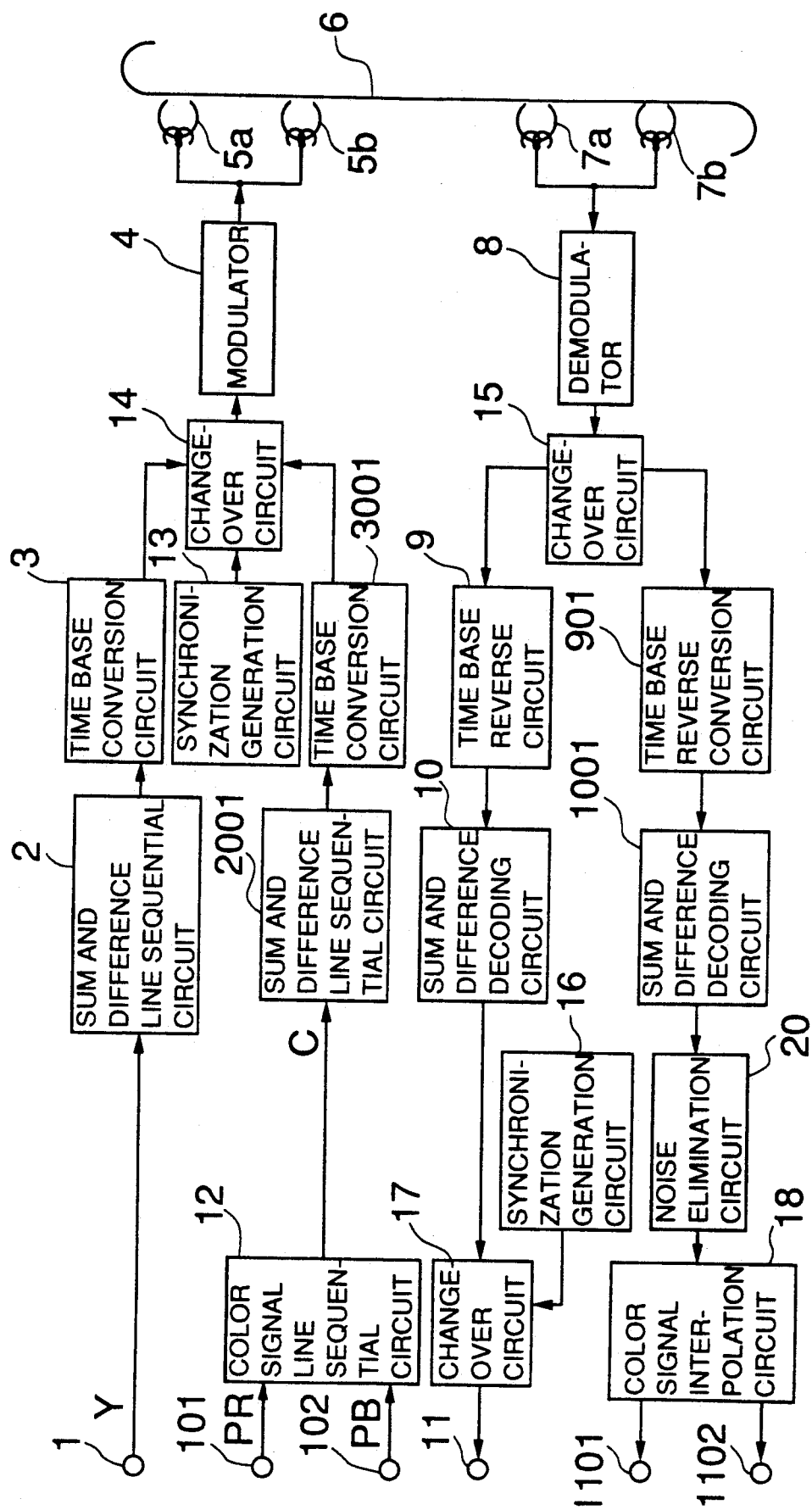
FIG. 14 is a block diagram showing still another embodiment of the present invention.

FIG. 14 shows a case where a noise elimination circuit of a color signal is applied to the embodiment shown in FIG. 7, and FIG. 14 has the same structure as that in FIG. 7, except that a noise elimination circuit is inserted between the sum and difference signal decoding circuit 1001 of the color signal and the color signal interpolation circuit 18. A color signal which has been converted to the state of the original video signal by the sum and difference signal decoding circuit 1001 is applied to a noise elimination circuit 20 in the state that two kinds of color signals PB and PR are line sequenced so that noise is eliminated. The two color signals PB and PR are separated from the color signal from which noise has been eliminated, by the color signal interpolation circuit 18, and the color signals are produced as continuous signals, from the terminals 1101 and 1102, after being interpolated by the signals before and after the lines during the period in which the respective color signals are not being outputted. When there occurs a delay in the color signals due to the insertion of the noise elimination circuit 20, the delayed processing of the color signal or the luminance signal is adjusted so that the phases of the reproduction output of the color signal and the luminance signal are matched, in the same manner as that in the above embodiment where the two-dimensional filter in FIG. 11 is applied.

Figure 15:
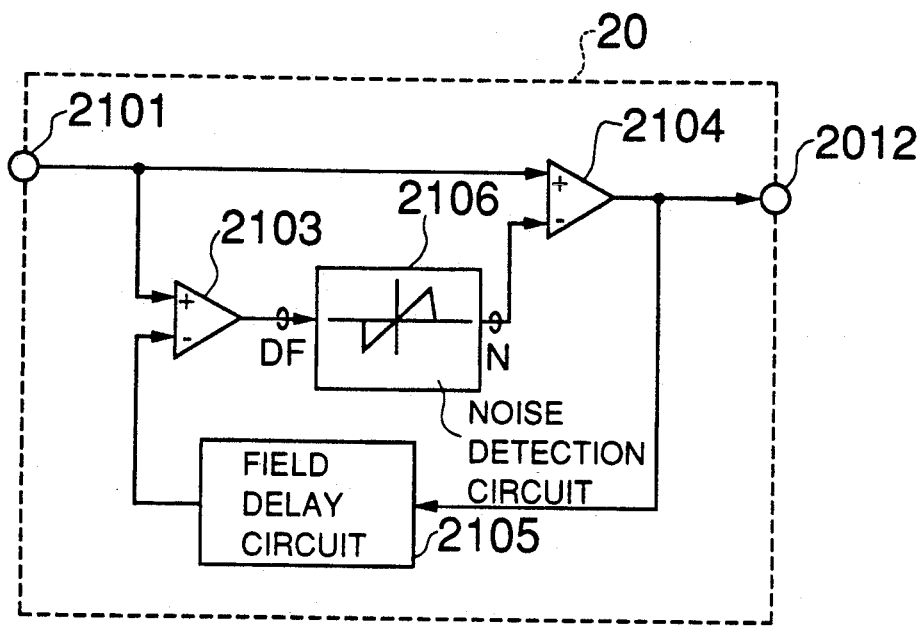
FIG. 15 is a block diagram showing an embodiment of a noise elimination circuit shown in FIG. 14.

An embodiment of the detailed structure of the noise elimination circuit 20 shown in FIG. 14 will be explained with reference to FIG. 15. In FIG. 15, 2101 designates an input terminal for a color signal which has been line sequenced by the sum and difference decoding circuit 1001, 2102 designates an output terminal for a color signal from which noise has been eliminated, 2103 and 2104 designate substractor circuits, 2105 designates a field delay circuit for outputting an input signal by delaying one field, and 2106 designates a noise detection circuit for detecting a noise signal N from a field difference signal DF. A color signal of which sum and difference signals have been decoded is inputted to the input terminal 2101 and is inputted to the positive input terminal of the subtraction circuit 2103 and the positive input terminal of the subtraction circuit 2104. A noise signal N which has been detected by the noise detection circuit 2106 is inputted to the negative input terminal of the subtraction circuit 2104, and the noise signal N is subtracted from the input color signal applied to the terminal 2101 that is connected to the positive input terminal. An output from the subtractor circuit 2104 is produced from the terminal 2102 as an output of the noise elimination circuit 20. The output of the subtractor circuit 2104 is also inputted to the field delay circuit 2105. A signal which has been delayed by one field in the field delay circuit 2105 is inputted to the negative input of the subtractor circuit 2103. The subtractor circuit 2103 subtracts an output of the field delay circuit 2105 inputted to the positive input terminal from the input color signal to the terminal 2101 that is connected to the positive input terminal, and produces an output of the field difference signal DF. The field difference signal DF is inputted to the noise detection circuit 2106, from which a noise signal N is outputted. The noise signal N detected by the noise detection circuit 2106 is inputted to the negative input terminal of the subtractor circuit 2104 and this is used to reduce noise component from the input color signal.

Figure 16:
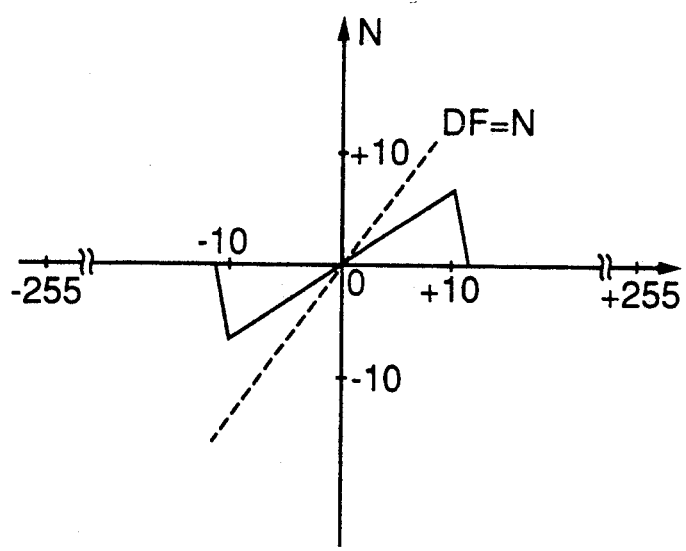
FIG. 16 is a diagram for explaining the operation of a noise detection circuit shown in FIG. 15.

The operation of the noise elimination circuit in FIG. 15 will be explained with reference to FIGS. 15 and 16. The field difference signal DF in FIG. 15 is a signal which is obtained by subtracting the signal that is a result of delaying the output to the terminal 2102 by one field, from the input signal to the terminal 2101. When there is a motion in the input video signal, the field difference signal DF includes a noise component which has no inter-field correlation with the field difference signal generated by the motion. In general, the field difference signal generated by a motion has a large signal level, with a small amplitude level of the noise component. Therefore, it is possible to extract only the noise component by the noise detection circuit 2106 having input and output characteristics as shown in FIG. 16. FIG. 16 shows input and output characteristics of the input DF and the output N of the noise detection circuit 2106. In the illustrated example, if the level of the DF is about −10 to +10 when the input video signal level is between 0 and 255, the field difference signal DF is decided as noise, and a signal proportional to the DF is outputted as a noise output N. When the DF level is equal to or lower than −10 or equal to or higher than +10, the field difference signal DF is decided as a difference signal due to the motion and the noise output N is made zero. Accordingly, the level of the field difference signal DF becomes high for the video signal at the time of a change of a scene or when there is an intense motion, so that zero is outputted for the noise signal N and the input video signal is outputted as it is through the subtractor circuit 2104. For a still image or a still area within a screen, the field difference signal DF includes only a low level noise component, and a noise signal N which is proportional to the DF is outputted from the noise detection circuit 2106. The noise component is subtracted from the input video signal by the subtractor circuit 2104 so that a video signal from which noise has been reduced is obtained from the terminal 2102. By detecting the motion by using the level of the field difference signal DF as described above, it is possible to realize a noise elimination circuit which minimizes a residual image even if there is a motion. In the noise elimination circuit shown in FIG. 15, even if the signals applied to this circuit are two kinds of color signals PB and PR which have been line sequenced, a field difference calculation is carried out for a field-delayed signal among the same kind of color signals and noise is eliminated based on the field difference signal DF if the transmission sequence of the PB and PR is constant regardless of the (odd or even) fields. Therefore, it is possible to simultaneously eliminate noise in the state that the two kinds of color signals are line sequenced.

When the noise elimination circuit is applied to the color signal as described above, it is possible to reduce noise of the color signal which distributes in the low frequency component and causes deterioration of the color quality. Further, when the noise elimination circuit is applied to the pre-stage of the color signal interpolation circuit 18 in the state that the two kinds of color signals PB and PR are line sequenced to eliminate noise, it is possible to reduce noise of the PB and PR simultaneously in one circuit with an effect of a reduced circuit scale.

In the embodiment shown in FIG. 15, noise is detected from the field difference signal and then the noise is reduced. However, it is also good to detect a noise signal from the frame difference signal. In this case, the field delay circuit 2105 in FIG. 15 is replaced with the circuit for delaying the frame. In the embodiment shown in FIG. 14, the noise elimination circuit has been applied to only the color signals. However, the noise elimination circuit may also be applied to the luminance signal. By reducing noise of the luminance signal together with the effect of noise reduction of the color signal by the noise elimination circuit, it is possible to reproduce a video signal of higher quality. In this case, the noise elimination circuit is inserted between the sum and difference decoding circuit 10 and the changeover circuit 17 for adding a synchronization signal in FIG. 14. As compared with the color signal, the luminance signal provides a striking residual image. Therefore, the noise detection circuit 2106 is structured to be able to decide a motion even if the difference signal is relatively small when a noise signal N is generated from the field difference signal DF. An example of this method will be explained below. In the example of the input and output characteristics of the noise detection circuit 2106 shown in FIG. 16, a motion is decided when the absolute value of the DF is equal to or greater than 10 and then the output N is made zero. However, this decision level may be set lower (for example, 7) and the N is set zero when the absolute value of the DF is equal to or greater than this value. By this arrangement, it is possible to reduce noise without deterioration of the picture quality due to a residual image of the luminance signal, and accordingly it is possible to realize a recording and reproducing apparatus for a video signal that can be reproduced in a higher picture quality.

According to the present invention, it is possible to reduce the band of a recording or transmitting signal without substantial deterioration of the picture quality because of human visual characteristics and characteristics of a general image, by converting an input video signal into a sum signal and a difference signal and by recording and transmitting the signals with a lowered transmission band for the difference signal.

It is also possible to record and transmit a color video signal in one transmission path by time base converting and multiplexing a sum signal and a difference signal of a color signal together with a sum signal and a difference signal of a luminance signal in accordance with a maximum frequency for the transmission of the signals.

It is also possible to reduce the recording and transmission band with higher efficiency by reducing a vertical or horizontal blanking period of an input video signal by the above-described time base conversion and by making long the effective multiplex period of the sum signal and the difference signal by the period corresponding to the above reduced period.

It is possible to prevent deterioration of the picture quality due to discontinuity of an image at the time of change-over of a magnetic head or due to noise, by arranging such that the effective period of the video signal is divided and time-base shifted as desired at the time of the time-base conversion and the signal is recorded by providing a redundant period between divided segments at the time of segment recording and this redundant period is reduced at the time of reproduction.

Further, it is possible to reduce the influence of noise of the difference signal that tends to occur in concentration near the zero level, by arranging such that the difference signal is recorded by having a high gain when the amplitude is small and by having a low gain when the amplitude is large and the reverse characteristics are utilized at the time of reproduction. By this arrangement, it is possible to reduce noise which is superposed on a reproduced video signal.

When the signal processing unit according to the present invention is realized by a sum and difference processing of two adjacent lines within a field, it is possible to have a dynamic image of which quality is equivalent to that of a still image. It is possible to realize the circuit necessary for signal processing in a small-scale circuit with a line memory of a few horizontal scanning periods for generating at least a sum signal and a difference signal.

When the sum signal and the difference signal of the luminance signal and the sum signal and the difference signal of the color signal are to be time base converted and multiplexed, it is possible to simplify the control circuit of the time base conversion processing circuit, etc. to have an economic effect by a reduced circuit scale, by selecting the multiplexing time of each of the above signals to be in the power of 2 such as 8:4:1:1 or the like.

As regards a discontinuity of edge information between a line block of two lines reproduced by the sum signal and the difference signal generated by a band control of the difference signal and a line block of two lines generated by the next sum signal and difference signal, it is possible to smooth the edge information between the adjacent line blocks by carrying out two-dimensional filter processing between the mutually adjacent line blocks. This has an effect of reducing deterioration of the picture quality generated by a discontinuity of edge information.

Further, by applying the noise elimination circuit to the line sequenced color signal, it is possible to eliminate noise which distributes in the low frequency and which superposes on the color signal to become a large factor of deterioration of the picture quality. This also has an effect of preventing deterioration of the picture quality due to an increased noise of the reproduced video signal. Further, when noise is eliminated in the state that the color signal is line sequenced, it is possible to eliminate noise of the two kinds of color signals PB and PR at the same time with one noise elimination circuit, with an economic effect of a reduced circuit scale.

It is possible to implement the present invention in the states other than those described in the above embodiments without deviating from the principle or main features of the present invention. Therefore, the above-described embodiments are only one example of the present invention in all respects and should not be regarded as limited. The scope of the present invention is shown in the scope of claim for a patent. Further, modification and changes belonging to the equivalent range of the scope of claim for a patent are all within the scope of the present invention.

What is claimed is:

1. A video signal processing unit for transmitting or recording and reproducing a video signal including signals of a plurality of lines in a horizontal scanning period (H) unit, comprising:

signal conversion means for converting said video signal into a sum signal based on a sum of signals and a difference based on a difference of signals of at least two adjacent lines respectively in at least two dimensional directions within one of a field, between fields of a vertical scanning frequency unit and between frames of said video signal; and time base conversion means for converting the time base of at least one of said sum signal and said difference signal so that the time base of said difference signal is shorter than the time base of said sum signal.

2. A video signal processing unit according to claim 1, wherein said signal conversion means includes means for adding an offset of a predetermined level to said difference signal.

3. A video signal processing unit according to claim 1, wherein said signal conversion means includes means for carrying out non-linear level conversion in accordance with an amplitude level of said difference signal.

4. A video signal processing unit according to claim 1, wherein said signal conversion means includes means for time-sharing multiplexing said signals with time-precedence placed on said sum signal over said difference signal.

5. A video signal processing unit according to claim 1, wherein said time base conversion means comprises:

synchronization signal generation means for generating a synchronization signal based on at least one of synchronization information of negative polarity synchronization information and burst information; and signal delay means for time-sharing multiplexing said signals with time-precedence placed on said synchronization signal over said sum signals and said difference signal.

6. A video signal processing unit according to claim 1, wherein said time base conversion means comprises means for time-base converting signals by extracting only a signal during an effective period which remains after eliminating at least a part of a horizontal blanking period of said sum signal and said difference signal included in said horizontal scanning period unit.

7. A video signal processing unit according to claim 1, wherein said time base conversion means comprises means for time-base converting signals by extracting only a signal during an effective period which remains after eliminating at least a part of a vertical blanking period of said sum signal and said difference signal included in said vertical scanning period unit.

8. A video signal processing unit according to claim 1, wherein said time base conversion means comprises means for time base converting said sum signal and said difference signal by time base allocating said signals so that said signals are time-sharing multiplexed within a period of one of about two times (2H) and more than two times of a horizontal scanning period (H) of said line signal.

9. A video signal processing unit according to claim 1, wherein said time base conversion means comprises means for time-base converting said sum signal and said difference signal by time base allocating said signals so that said signals are time-sharing multiplexed at the ratio of 2:1.

10. A video signal processing unit according to claim 1, wherein said signal conversion means converts said video signal in three-dimensional directions.

11. A video signal processing unit for transmitting in at least one channel or recording and reproducing a video signal which includes a luminance signal (Y) and two color signals (PB, PR) and which is structured by signals of a plurality of lines in a horizontal scanning period (H) unit, comprising:

first signal conversion means for converting said luminance signal (Y) into a first sum signal and a first difference signal based on a sum and a difference respectively of signals of at least two adjacent lines in at least two dimensional directions within one of a field of a vertical scanning period unit, between fields and between frames of said luminance signal (Y);

second signal conversion means for converting at least one of color signals of said two color signals (PB, PR) into a second sum signal and a second difference signal based on a sum and a difference respectively of signals of one of at least two adjacent lines and alternately adjacent lines in at least two-dimensional directions within one of a field of a vertical scanning period unit, between fields and between frames of said color signal;

time base conversion means for converting the time base of at least one of said first sum signal and said second sum signal so that the time base of said second sum signal becomes shorter than the time base of said first sum signal and for converting the time base of at least one of said first difference signal and said second difference signal so that the time base of said second difference signal becomes shorter than the time base of said first difference signal; and signal multiplexing means for time-sharing multiplexing said time base converted first sum signal and difference signal and said time base converted second sum signal and difference signal respectively.

12. A video signal processing unit according to claim 11, wherein said second signal conversion means comprises means for alternately line sequencing said two color signals (PB, PR) in a line unit, converting one of the signals (PB) into said second sum signal and said second difference signal based on a sum $(PB_{4n}+PB_{4n+2})$ and a difference $(PB_{4n}-PB_{4n+2})$ respectively of signals of at least two lines of alternately adjacent lines and ($PB_{4n}$ and $PB_{4n+2}$, where a subscript number designates a line number and n designates a desired integer) and for converting the other signal (PR) into said second sum signal and said second difference signal based on a sum $(PR_{4n+1}+PR_{4n+3})$ and a difference $(PR_{4n+1}-PR_{4n+3})$ respectively of signals of at least lines of alternately adjacent lines ($PR_{4n+1}$ and $PR_{4n+3}$, where a subscript number designates a line number).

13. A video signal processing unit according to claim 11, wherein said second signal conversion means comprises means for adding an offset of a predetermined level to said second difference signal.

14. A video signal processing unit according to claim 11, wherein said second signal conversion means comprises means for carrying out non-linear level conversion in accordance with the amplitude level of said second difference signal.

15. A video signal processing unit according to claim 11, wherein said second signal conversion means comprises means for time-sharing multiplexing said signals with time-precedence placed on said second sum signal over said second difference signal.

16. A video signal processing unit according to claim 11, wherein said signal multiplexing means comprises means for time-sharing multiplexing said signals with time-precedence placed on said first sum signal and difference signal over said second sum signal and difference signal.

17. A video signal processing unit according to claim 11, wherein said signal multiplexing means comprises:

synchronization signal generation means for generating a synchronization signal based on at least one of synchronization information of negative polarity synchronization information and burst information; and signal delay means for time-sharing multiplexing said signals with time-precedence placed on said synchronization signal over said first sum signal and difference signal and said second sum signal and difference signal.

18. A video signal processing unit according to claim 11, wherein said time base conversion means comprises means for time-base converting signals by extracting only a signal during an effective period which remains after eliminating at least a part of a horizontal blanking period of said first sum signal and difference signal and said second sum signal and difference signal included in said horizontal scanning period unit.

19. A video signal processing unit according to claim 11, wherein said time base conversion means comprises means for time-base converting signals by extracting only a signal during an effective period which remains after eliminating at least a part of a horizontal blanking period of said first sum signal and difference signal and said second sum signal and difference signal included in said vertical scanning period unit.

20. A video signal processing unit according to claim 11, wherein said time base conversion means comprises means for time base converting said first sum signal and difference signal and said second sum signal and difference signal by time base allocating said signals so that said signals are time-sharing multiplexed within a period of one of about two times (2H) or more than two times of a horizontal scanning period (H) of said line signal.

21. A video signal processing unit according to claim 11, wherein said time base conversion means comprises means for time base converting said first sum signal and difference signal and said second sum signal and difference signal by time base allocating said signals so that said signals are time sharing multiplexed at the ratio of 8:4:2:1.

22. A video signal processing unit according to claim 11, wherein said time base conversion means comprises means for time base converting so as to provide a guard period of a predetermined time width between said first sum signal and said first difference signal and between said second sum signal and said second difference signal respectively.

23. A video signal processing unit according to claim 11, wherein said time base conversion means comprises:
segment dividing means for forming a signal of segment block including a plurality of unit signals which include each one of said first sum signal and difference signal and said second sum signal and difference signal and for dividing said signals into signals of at least two of said segment blocks during one vertical scanning period; and
time base processing means for generating a redundant period of a predetermined time width between said segment block signals.

24. A video signal processing unit according to claim 11, wherein said first signal conversion means converts said luminance signal in three-dimensional directions and said second signal conversion means converts at least one of said color signals in three-dimensional directions.

25. A video signal processing unit for transmitting in at least one channel or recording and reproducing a video signal which includes a luminance signal (Y) and two color signals (PB, PR) and which is structured by signals of a plurality of lines in a horizontal scanning period (H) unit, comprising:
first signal conversion means for converting said luminance signal (Y) into a first sum signal and a first difference signal based on a sum and a difference respectively of signals of at least two adjacent lines in at least two-dimensional directions within one of a field of a vertical scanning period unit, between fields and between frames of said luminance signal (Y);
second signal conversion means for converting at least one of color signals of said two color signals (PB, PR) into a second sum signal and a second difference signal based on a sum and a difference respectively of signals of one of at least two adjacent lines and alternately adjacent lines in at least two-dimensional directions within one of a field of a vertical scanning period, between fields and between frames of said color signals;
first time base conversion means for time-sharing multiplexing said first sum signal and difference signal and said second sum signal and difference signal within a period one of about 2 times (2H) and more than two times of the horizontal scanning period (H) of said line signals and for time base converting said signals such that the time base of said first difference signal is shorter than the time base of said first sum signals and the time base of said second difference signal is shorter than the time base of said second sum signal;
signal modulation means for suitably modulating said time base converted signal in accordance with one of a transmission and a recording medium;
signal recording means for one of transmitting and recording said modulated signal to said medium;
signal reproducing means for reproducing a signal from said medium;
signal demodulating means for demodulating said reproduced signal;
second time base conversion means for separating and extracting said first sum signal and difference signal and said second sum signal and difference signal that are time-sharing multiplexed on said demodulated signal from said demodulated signal and for time base converting said signals so that the time base of said first sum signal becomes equal to the time base of said first difference signal and the time base of said second sum signal becomes equal to the time base of said second difference signal;
first signal generation means for generating a third sum signal and a third difference signal based on a sum and a difference respectively of said first sum signal and said first difference signal that have been time base converted by said second time base conversion means;
second signal generation means for generating a fourth sum signal and a fourth difference signal based on a sum and a difference respectively of said second sum signal and said second difference signal that have been time base converted by said second time base conversion means; and
signal reproducing and output means for reproducing a signal based on said luminance signal (Y) in said horizontal scanning period (H) unit from an output signal of said first signal generation means and for reproducing a signal based on said two color signals (PB, PR) in said horizontal scanning period (H) unit from an output signal of said second signal generation means.

26. A video signal processing unit according to claim 25, wherein said signal reproducing and output means comprises:
edge signal detection means for detecting an edge signal based on edge information included in a video signal from said output signal from said first signal generation means; and
edge signal averaging means for averaging said detected edge signal between said output signals from said first signal generation means generated from at least two pairs of said first sum signal and said first difference signal which are adjacent and are different signals.

27. A video signal processing unit according to claim 25, wherein said signal reproducing and output means comprises:
difference signal generation means for generating a difference signal based on a difference between fields or between frames from an output signal of said second signal generation means;

noise detection means for detecting a noise signal based on noise from said difference signal; and noise reduction means for reducing noise from said output signal of said second signal generation means based on said detected noise signal.

28. A video signal processing unit according to claim 25, wherein said first signal conversion means converts said luminance signal in three-dimensional directions and said second signal conversion means converts at least one of said color signals in three-dimensional directions.

29. A video signal processing unit for transmitting in at least one channel or recording and reproducing a video signal which includes a luminance signal (Y) and two color signals (PB, PR) and which is structured by signals of a plurality of lines in a horizontal scanning period (H) unit, comprising:

color signal line sequential means for converting said two color signals (PB, PR) into a series of signals by alternately line sequencing said signals in a line unit;

signal conversion means for converting said line sequenced color signals and said luminance signal (Y) into a recording signal of at least one channel;

signal modulation means for suitably modulating said converted recording signal in accordance with one of a transmission and a recording medium;

signal recording means for one of transmitting and recording said modulated signal to said medium;

signal reproducing means reproducing a signal from said medium;

signal demodulation means for demodulating said reproduced signal;

signal dividing means for dividing said demodulated signal into a series of line sequenced color signal and luminance signal;

noise reduction means for reducing noise of said divided series of line sequenced color signal; and signal reproducing and output means for reproducing a signal based on said luminance signal (Y) in said horizontal scanning period (H) unit form a signal divided by said signal dividing means and for reproducing a signal based on said two color signals (PB, PR) in said horizontal scanning period (H) unit form an output signal of said noise reduction means.

* * * * *